United States Patent
Sugimoto

(10) Patent No.: US 11,598,258 B2
(45) Date of Patent: Mar. 7, 2023

(54) MISFIRE DETERMINATION APPARATUS AND METHOD FOR INTERNAL COMBUSTION ENGINE

(71) Applicant: TOYOTA JIDOSHA KABUSHIKI KAISHA, Aichi-ken (JP)

(72) Inventor: Hitoki Sugimoto, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/475,292

(22) Filed: Sep. 14, 2021

(65) Prior Publication Data

US 2022/0099528 A1 Mar. 31, 2022

(30) Foreign Application Priority Data

Sep. 25, 2020 (JP) .............................. JP2020-160653

(51) Int. Cl.
| | | |
|---|---|---|
| *G01M 15/11* | (2006.01) | |
| *F02D 41/00* | (2006.01) | |
| *F02B 75/18* | (2006.01) | |
| *F02D 41/22* | (2006.01) | |
| *G01M 15/05* | (2006.01) | |

(52) U.S. Cl.
CPC ............ *F02B 75/18* (2013.01); *F02D 41/009* (2013.01); *F02D 41/0087* (2013.01); *F02D 41/22* (2013.01); *F02D 2200/101* (2013.01); *F02D 2200/1002* (2013.01); *G01M 15/05* (2013.01)

(58) Field of Classification Search
CPC .......... F02D 41/0087; F02D 2200/101; G01M 15/11
USPC ............................ 123/198 F, 481; 73/114.04
See application file for complete search history.

(56) References Cited

U.S. PATENT DOCUMENTS

| | | | |
|---|---|---|---|
| 5,275,037 A | 1/1994 | Nakayama et al. | |
| 5,309,756 A | 5/1994 | Osawa et al. | |
| 6,336,440 B1 | 1/2002 | Schmitz et al. | |
| 9,399,963 B2 * | 7/2016 | Loucks ................. | G01M 15/11 |
| 9,835,522 B2 * | 12/2017 | Chen .................. | F02M 35/1038 |
| 10,088,388 B2 * | 10/2018 | Chen ...................... | F02D 41/22 |

(Continued)

FOREIGN PATENT DOCUMENTS

| | | |
|---|---|---|
| DE | 19825990 A1 | 12/1999 |
| JP | H560004 A | 3/1993 |
| JP | 2009138663 A | 6/2009 |

*Primary Examiner* — Erick R Solis
(74) *Attorney, Agent, or Firm* — Hauptman Ham, LLP

(57) ABSTRACT

A CPU determines that misfires are occurring in a cylinder subject to determination of whether misfires are occurring when a value obtained by subtracting a rotation fluctuation amount ΔT30[n−2] from a rotation fluctuation amount ΔT30[n] is greater than or equal to a determination threshold. The rotation fluctuation amount ΔT30[n] is subject to the misfire determination. The rotation fluctuation amount ΔT30[n−2] is 360° CA earlier than the rotation fluctuation amount ΔT30[n]. When stopping fuel supply to a cylinder #1 and determining whether misfires are occurring in cylinder #4, the CPU determines whether misfires are occurring after executing a correcting process that corrects the determination threshold to a second determination threshold Δth2, which is less than a first determination threshold Δth1.

5 Claims, 10 Drawing Sheets

(56) References Cited

U.S. PATENT DOCUMENTS

| | | | |
|---|---|---|---|
| 2014/0261317 A1* | 9/2014 | Loucks | F02D 19/0623 |
| | | | 123/350 |
| 2019/0234323 A1 | 8/2019 | Weber et al. | |
| 2021/0062746 A1* | 3/2021 | Hashimoto | F02D 41/1405 |
| 2022/0099041 A1* | 3/2022 | Anzawa | G01M 15/11 |
| 2022/0099529 A1* | 3/2022 | Anzawa | G01M 15/11 |

\* cited by examiner

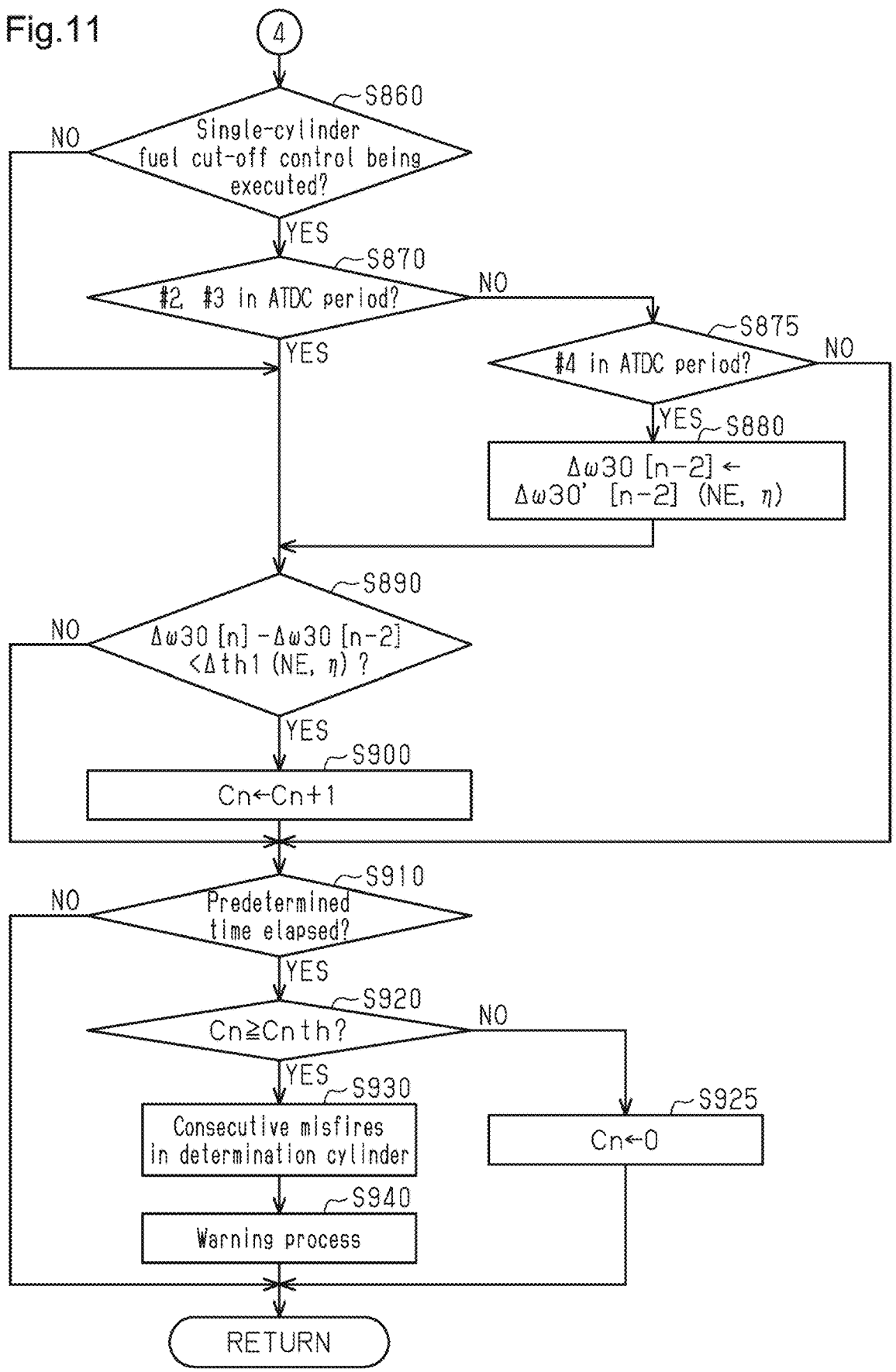

MISFIRE DETERMINATION APPARATUS AND METHOD FOR INTERNAL COMBUSTION ENGINE

RELATED APPLICATIONS

The present application claims priority of Japanese Application Number 2020-160653, filed on Sep. 25, 2020, the disclosure of which is hereby incorporated by reference herein in its entirety.

BACKGROUND

1. Field

The present disclosure relates to a misfire determination apparatus and method for an internal combustion engine.

2. Description of Related Art

Japanese Laid-Open Patent Publication No. 2009-138663 discloses a misfire determination apparatus that calculates rotation speed fluctuation amounts in different crank angle ranges from a rotation speed of a crankshaft within an angular interval shorter than the interval of the compression top dead center (instantaneous rotation speed), and determines whether misfires are occurring based on the difference between the rotation speed fluctuation amounts. Specifically, the misfire determination apparatus determines that misfires are occurring when the difference between rotation speed fluctuation amounts at points in time separated from each other by 360° crank angle (CA) is greater than a threshold. The misfire determination apparatus does not use the rotation speed fluctuation amount at the expansion stroke of a determination cylinder, which is subject to misfire detection, as the value to be compared with the threshold. Instead, the misfire determination apparatus uses a value obtained by subtracting, from the rotation speed fluctuation amount of the determination cylinder, the rotation speed fluctuation amount that is 360° CA earlier. This configuration is employed to reduce the influence of manufacturing variations in crank angle sensors (paragraph 0003).

The inventor considered employing a configuration of an internal combustion engine that supplies oxygen to exhaust gas by stopping fuel supply to part of the cylinders and supplying fuel to the remaining cylinders in order to perform a regeneration process of an exhaust purification device when the shaft torque of the engine is not zero. In this configuration, the rotation speed fluctuation amount that is 360° CA earlier than the rotation speed fluctuation amount of the determination cylinder may be calculated based on an instantaneous rotation speed that corresponds to the part of the cylinders to which fuel supply is stopped. In this case, even if misfires are occurring in the determination cylinder, misfires cannot be determined since the difference between the rotation speed fluctuation amounts is relatively small.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a misfire determination apparatus for an internal combustion engine is provided. The internal combustion engine is a multi-cylinder internal combustion engine having a catalyst that is provided in an exhaust system and purifies exhaust gas. The misfire determination apparatus being configured to execute: a single-cylinder fuel cut-off process that executes a single-cylinder fuel cut-off control that stops fuel supply to a fuel cut-off cylinder and performs fuel supply to other remaining combustion cylinders; an instantaneous speed calculating process that calculates an instantaneous speed variable, the instantaneous speed variable being an index value of a rotation speed of a crankshaft; a rotation fluctuation amount calculating process that calculates a rotation fluctuation amount, the rotation fluctuation amount being an amount of change of the instantaneous speed variable; a fluctuation amount difference value calculating process that calculates a fluctuation amount difference value obtained by subtracting, from a first rotation fluctuation amount, a second rotation fluctuation amount, the first rotation fluctuation amount being the rotation fluctuation amount of a determination cylinder, which is subject to misfire detection, and the second rotation fluctuation amount being the rotation fluctuation amount of a reference cylinder, the reference cylinder reaching an expansion stroke at a point in time that is earlier than an expansion stroke of the determination cylinder by 360° CA multiplied by an integer; a misfire determining process that determines that a misfire has occurred in the determination cylinder when a misfire condition is satisfied based on a magnitude relationship between the fluctuation amount difference value and a determination threshold; and a correcting process that performs, if the reference cylinder is the fuel cut-off cylinder when the misfire determining process is executed, a correction for reducing an influence of a fact that the reference cylinder is the fuel cut-off cylinder on a result of a misfire determination.

In another general aspect, a misfire determination apparatus for an internal combustion engine is provided. The internal combustion engine is a multi-cylinder internal combustion engine having a catalyst that is provided in an exhaust system and purifies exhaust gas. The misfire determination apparatus includes circuitry. The circuitry is configured to execute: a single-cylinder fuel cut-off process that executes a single-cylinder fuel cut-off control that stops fuel supply to a fuel cut-off cylinder and performs fuel supply to other remaining combustion cylinders; an instantaneous speed calculating process that calculates an instantaneous speed variable, the instantaneous speed variable being an index value of a rotation speed of a crankshaft; a rotation fluctuation amount calculating process that calculates a rotation fluctuation amount, the rotation fluctuation amount being an amount of change of the instantaneous speed variable; a fluctuation amount difference value calculating process that calculates a fluctuation amount difference value obtained by subtracting, from a first rotation fluctuation amount, a second rotation fluctuation amount, the first rotation fluctuation amount being the rotation fluctuation amount of a determination cylinder, which is subject to misfire detection, and the second rotation fluctuation amount being the rotation fluctuation amount of a reference cylinder, the reference cylinder reaching an expansion stroke at a point in time that is earlier than an expansion stroke of the determination cylinder by 360° CA multiplied by an integer; a misfire determining process that determines that a misfire has occurred in the determination cylinder when a misfire condition is satisfied based on a magnitude relationship between the fluctuation amount difference value and a determination threshold; and a correcting process that performs, if the reference cylinder is the fuel cut-off cylinder when the misfire determining process is executed, a correction for reducing an influence of a fact that the reference cylinder is the fuel cut-off cylinder on a result of a misfire determination.

In a further general aspect, a misfire determination method for an internal combustion engine is provided. The internal combustion engine is a multi-cylinder internal combustion engine having a catalyst that is provided in an exhaust system and purifies exhaust gas. The misfire determination method includes: executing a single-cylinder fuel cut-off control that stops fuel supply to a fuel cut-off cylinder and performs fuel supply to other remaining combustion cylinders; calculating an instantaneous speed variable, the instantaneous speed variable being an index value of a rotation speed of a crankshaft; calculating a rotation fluctuation amount, the rotation fluctuation amount being an amount of change of the instantaneous speed variable; calculating a fluctuation amount difference value obtained by subtracting, from a first rotation fluctuation amount, a second rotation fluctuation amount, the first rotation fluctuation amount being the rotation fluctuation amount of a determination cylinder, which is subject to misfire detection, and the second rotation fluctuation amount being the rotation fluctuation amount of a reference cylinder, the reference cylinder reaching an expansion stroke at a point in time that is earlier than an expansion stroke of the determination cylinder by 360° CA multiplied by an integer; determining that a misfire has occurred in the determination cylinder when a misfire condition is satisfied based on a magnitude relationship between the fluctuation amount difference value and a determination threshold; and performing, if the reference cylinder is the fuel cut-off cylinder when the misfire determining process is executed, a correction for reducing an influence of a fact that the reference cylinder is the fuel cut-off cylinder on a result of a misfire determination.

Other features and aspects will be apparent from the following detailed description, the drawings, and the claims.

BRIEF DESCRIPTION OF THE DRAWINGS

FIG. 11 is a flowchart showing a procedure of the process related to detection of misfires according to the fourth embodiment.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A misfire determination apparatus for an internal combustion engine 10 according to a first embodiment will now be described with reference to FIGS. 1 to 5.

Figure 1:
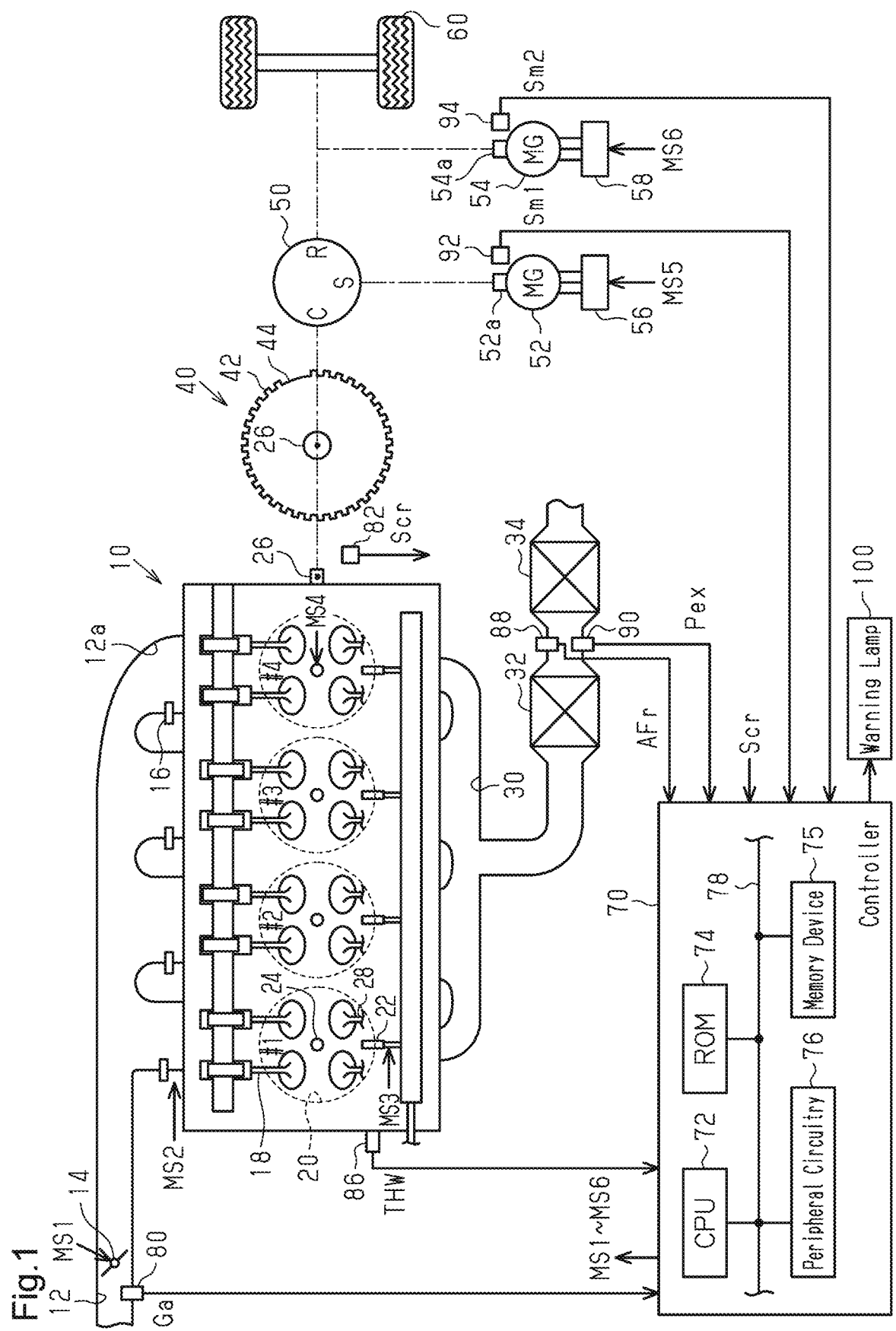
FIG. 1 is a diagram showing a drivetrain and a control system for the drivetrain according to a first embodiment.

FIG. 1 shows a drivetrain and a control system for the drive system according to a first embodiment.

As shown in FIG. 1, the internal combustion engine 10 includes four cylinders #1 to #4. An intake passage 12, which is disposed upstream of the internal combustion engine 10, incorporates a throttle valve 14. The intake passage 12 includes a downstream section divided into branches connected to the respective cylinders. The branches connected to the cylinders are intake ports 12a, each of which is provided with a port injection valve 16. Air drawn into the intake passage 12 and fuel injected from the port injection valves 16 flow into combustion chambers 20 when intake valves 18 are opened. A direct injection valve 22 injects fuel into each combustion chamber 20. The mixture of air and fuel drawn into each combustion chamber 20 and fuel injected by the corresponding direct injection valve 22 are burned by spark discharge of an ignition plug 24 provided in the combustion chamber 20. This generates combustion energy, which is in turn converted into rotational energy of a crankshaft 26.

The air-fuel mixture burned in the combustion chambers 20 is discharged to an exhaust passage 30 as exhaust gas when exhaust valves 28 are opened. The exhaust passage 30 is provided with a three-way catalyst 32, which has an oxygen storage capacity, and a gasoline particulate filter (GPF 34). The GPF 34 includes a filter, and the filter traps particulate matter (PM) in the exhaust gas and supports a three-way catalyst.

A crank rotor 40 having teeth 42 is coupled to the crankshaft 26. The teeth 42 are basically arranged at 10° CA intervals on the crank rotor 40. The crank rotor 40 also has toothless section 44, at which the interval between the adjacent teeth 42 is 30° CA. The toothless section 44 indicates a referential rotation angle of the crankshaft 26.

The crankshaft 26 is mechanically coupled to a carrier C of a planetary gear mechanism 50, which is part of a power splitter. The planetary gear mechanism 50 includes a sun gear S, which is mechanically coupled to a rotary shaft 52a of a first motor-generator 52. The planetary gear mechanism 50 includes a ring gear R, which is mechanically coupled to a rotary shaft 54a of a second motor-generator 54 and to driven wheels 60. Alternating voltage of a first inverter 56 is applied to terminals of the first motor-generator 52. Also, alternating voltage of a second inverter 58 is applied to terminals of the second motor-generator 54.

A controller 70 controls the internal combustion engine 10 and operates operated units of the internal combustion engine 10, such as the throttle valve 14, the port injection valves 16, the direct injection valves 22, and the ignition plugs 24, thereby controlling torque and the ratios of exhaust components, which are controlled variables. Also, the controller 70 controls the first motor-generator 52. Specifically, the controller 70 operates the first inverter 56, thereby controlling the rotation speed, which is a controlled variable, of the first motor-generator 52. Further, the controller 70 controls the second motor-generator 54. Specifically, the controller 70 operates the second inverter 58, thereby controlling torque, which is a controlled variable, of the second motor-generator 54. FIG. 1 shows operation signals MS1 to MS6 respectively corresponding to the throttle valve 14, the port injection valves 16, the direct injection valves 22, the ignition plugs 24, and the inverters 56, 58. To control controlled variables of the internal combustion engine 10, the controller 70 refers to an intake air amount Ga detected by an air flow meter 80, an output signal Scr of a crank angle sensor 82, and a coolant temperature THW detected by a coolant temperature sensor 86. Also, to control controlled variables of the internal combustion engine 10, the controller 70 refers to an air-fuel ratio $\Delta Fr$ detected by an air-fuel ratio sensor 88 disposed upstream of the three-way catalyst 32, and a pressure Pex of exhaust gas flowing into the GPF 34 detected by an exhaust pressure sensor 90. Further, to control controlled variables of the first motor-generator 52 and the second motor-generator 54, the controller 70 refers to an output signal Sm1 of a first rotation angle sensor 92, which detects a rotation angle of the first motor-generator 52, and an output signal Sm2 of a second rotation angle sensor 94, which detects a rotation angle of the second motor-generator 54.

The controller 70 includes a central processing unit (CPU) 72, a read-only memory (ROM) 74, a memory device 75, and peripheral circuitry 76, which can communicate with each other through a communication line 78. The peripheral circuitry 76 includes a circuit that generates a clock signal regulating internal operations, a power supply circuit, and a reset circuit. The controller 70 controls the controlled variables by causing the CPU 72 to execute programs stored in the ROM 74.

Figure 2:
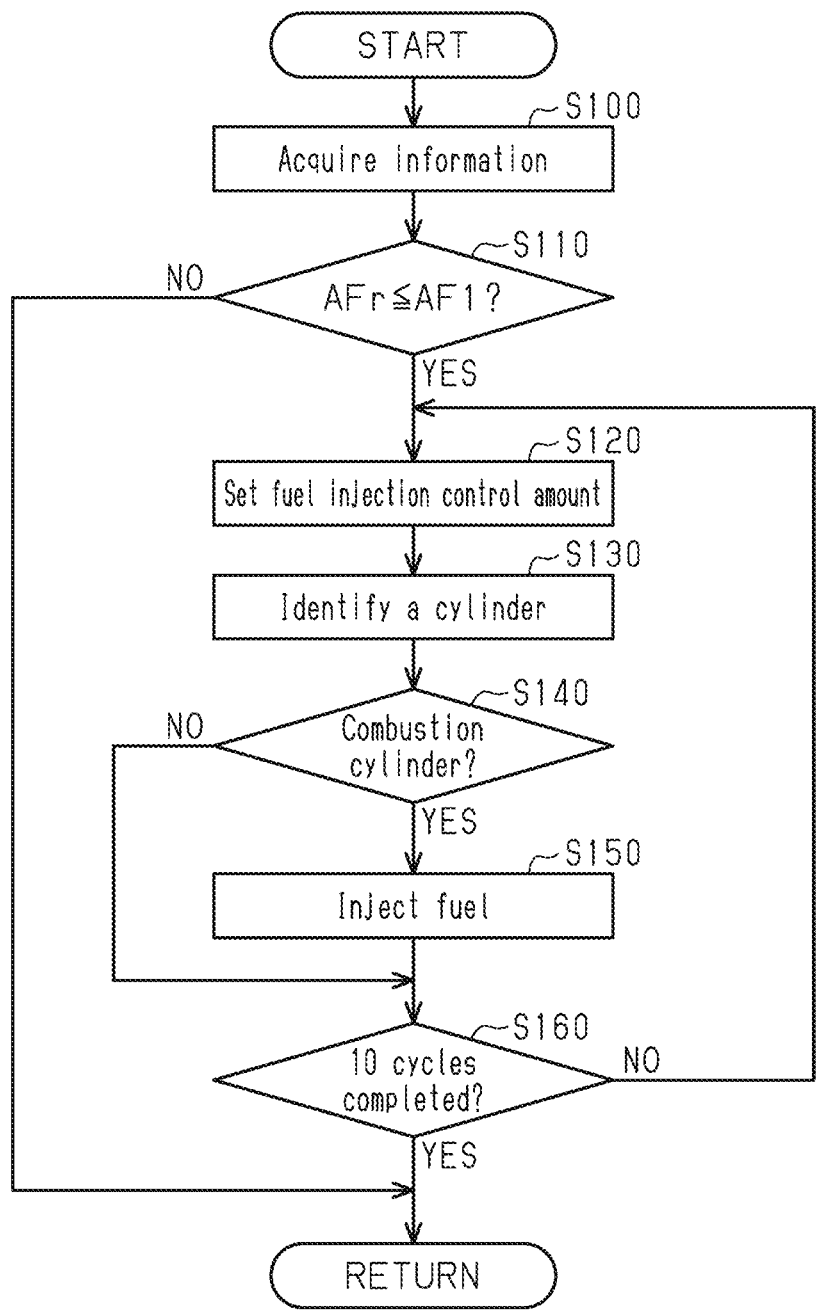
FIG. 2 is a flowchart showing a procedure of a single-cylinder fuel cut-off control.

FIG. 2 shows a procedure of a single-cylinder fuel cut-off control executed by the controller 70 of the present embodiment. The process shown in FIG. 2 is implemented by the CPU 72 repeatedly executing programs stored in the ROM 74 at a predetermined interval. In the following description, the number of each step is represented by the letter S followed by a numeral.

In the series of processes shown in FIG. 2, the CPU 72 first acquires a rotation speed NE, a charging efficiency $\eta$, the output signal Scr, and the air-fuel ratio $\Delta Fr$ (S100). The rotation speed NE is calculated by the CPU 72 based on the output signal Scr. The charging efficiency $\eta$ is calculated by the CPU 72 based on the intake air amount Ga and the rotation speed NE. The torque of the internal combustion engine 10 increases as the charging efficiency $\eta$ increases. In the present embodiment, the charging efficiency $\eta$ is calculated as an index value of the torque of the internal combustion engine 10. The CPU 72 then compares the obtained air-fuel ratio $\Delta Fr$ with a single-cylinder fuel cut-off execution value AF1 (S110). When the air-fuel ratio $\Delta Fr$ is greater than the single-cylinder fuel cut-off execution value AF1, the CPU 72 temporarily suspends the series of processes shown in FIG. 2 without executing single-cylinder fuel cut-off control (S110: NO). That is, based on the fact that the air-fuel ratio is greater than the single-cylinder fuel cut-off execution value AF1, the CPU 72 determines that there is no need to supply oxygen to the three-way catalyst 32 since the air-fuel ratio is lean, and does not execute the single-cylinder fuel cut-off control. When the air-fuel ratio $\Delta Fr$ is less than or equal to the single-cylinder fuel cut-off execution value AF1 (S110: YES), the CPU 72 sets the fuel injection amount for the cylinders #1 to #4 based on an engine torque command value Te*, which is a command value of the torque of the internal combustion engine 10 (S120).

In S120, the CPU 72 sets the fuel injection amount to one of the cylinders #1 to #4 (for example, cylinder #1) to zero, and sets the fuel injection amount to the remaining cylinders (for examples, cylinder #2, cylinder #3, and cylinder #4) such that the stoichiometric air-fuel ratio is achieved. Hereinafter, stopping of fuel supply will be referred to as fuel cut-off (F/C). A cylinder to which fuel supply is stopped will be referred to as a fuel cut-off cylinder. The cylinder to which fuel is supplied will be referred to as a combustion cylinder.

After S120, the CPU 72 identifies a cylinder that has reached the point in time at which fuel injection is started based on the output signal Scr (S130). When the identification process of step S130 identifies that the fuel cut-off cylinder (cylinder #1) has reached the point in time at which fuel injection is started (S140: NO), the CPU 72 determines whether ten cycles of fuel injection, during which the internal combustion engine 10 revolves twenty times, have been completed without injecting fuel from the port injection valve 16 or the direct injection valve 22 that correspond to one cylinder (S160). During a period in which fuel supply to the fuel cut-off cylinder (cylinder #1) is stopped (during fuel cut-off), the intake valves 18 and the exhaust valves 28 of the fuel cut-off cylinder are respectively opened and closed as in the case of a normal fuel supply. When the identification process of step S130 identifies that any of the combustion cylinders (cylinder #2, cylinder #3, or cylinder #4) has reached the point in time at which fuel injection is started (S140: YES), the CPU 72 causes the port injection valve 16 and the direct injection valve 22 that correspond to the combustion cylinder to inject fuel (S150), and determines whether ten cycles of fuel injection have been completed (S160).

When ten cycles of fuel injection have not been completed (S160: NO), the CPU 72 repeats the processes of S120 to S150. When ten cycles of fuel injection have been completed (S160: YES), the CPU 72 ends the series of processes. In the next control cycle, the CPU 72 executes the processes starting from step S100 again.

Figure 3:
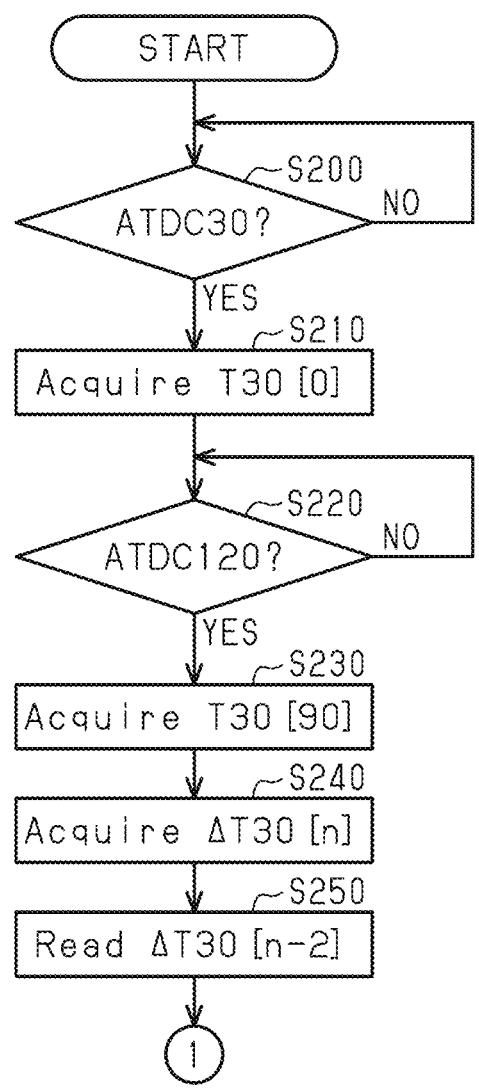
FIG. 3 is a flowchart showing a procedure of a process related to detection of misfires.
Figure 4:
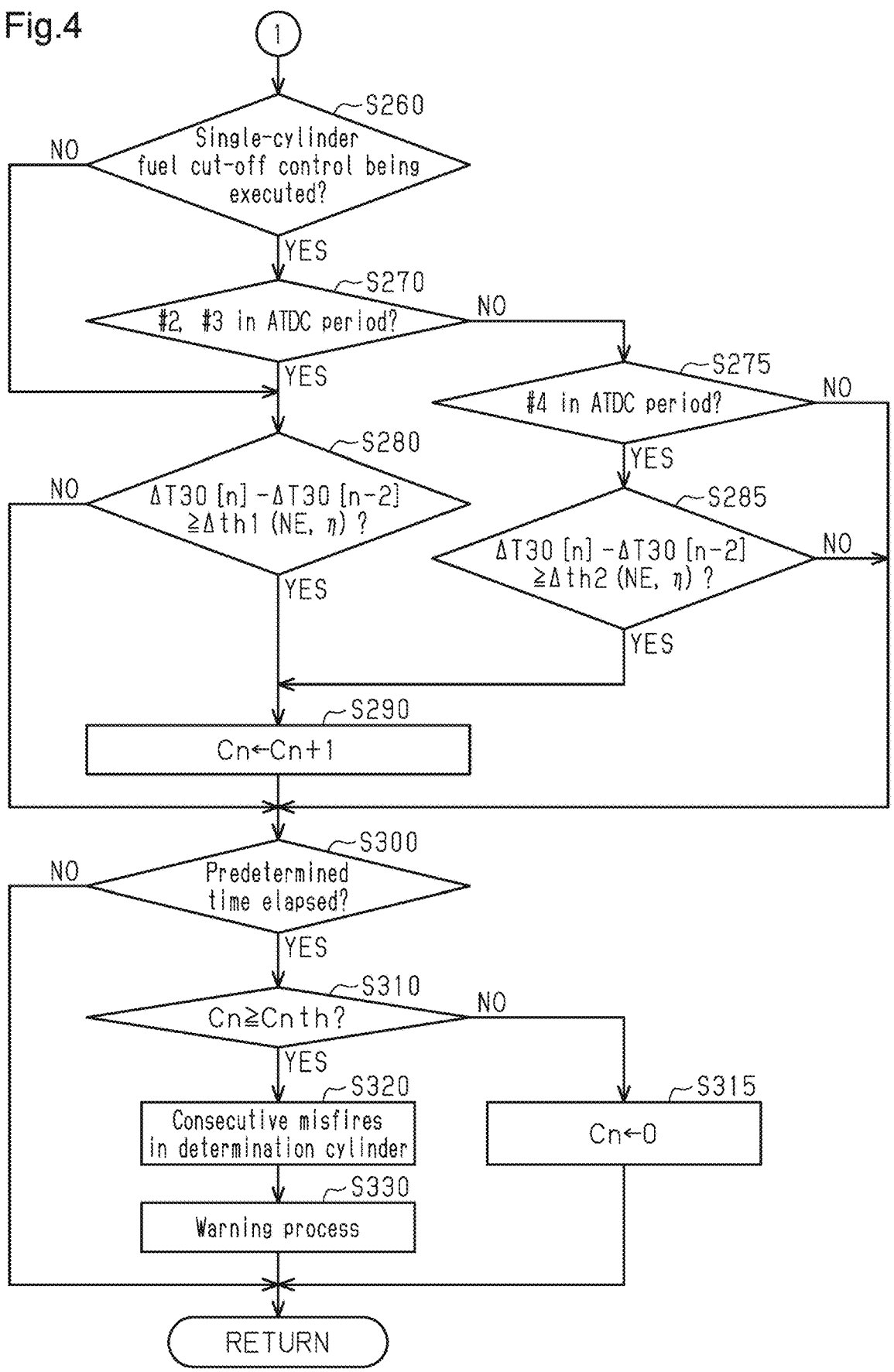
FIG. 4 is a flowchart showing a procedure of the process related to detection of misfires.

FIGS. 3 and 4 show another process executed by the controller 70. The process shown in FIGS. 3 and 4 is implemented by the CPU 72 repeatedly executing programs stored in the ROM 74 at a predetermined interval. FIGS. 3 and 4 show a procedure in which the cylinder #1, the cylinder #3, the cylinder #4, and the cylinder #2 reach the combustion stroke in the order, and the cylinder #1 is a fuel cut-off cylinder. When the cylinder #2, the cylinder #3, and the cylinder #4 are each a fuel cut-off cylinder, the cylinder numbers are replaced as necessary.

In the series of processes shown in FIGS. 3 and 4, the CPU 72 first determines whether the current rotation angle of the crankshaft 26 is 30° CA after top dead center (ATDC) with respect to the compression top dead center of any of the cylinders #1 to #4 (S200). When the current rotation angle of the crankshaft 26 is not 30° CA ATDC (S200: NO), the CPU 72 stands by until the current rotation angle is 30° CA ATDC. When the current rotation angle of the crankshaft 26 is 30° CA ATDC (S200: YES), the CPU 72 acquires time T30[0], which is time required by the crankshaft 26 to rotate 30° CA from the compression top dead center (S210). Next, the CPU 72 determines whether the current rotation angle of the crankshaft 26 is 120° CA ATDC (S220). When the current rotation angle of the crankshaft 26 is not 120° CA ATDC (S220: NO), the CPU 72 stands by until the current rotation angle is 120° CA ATDC. When the current rotation angle of the crankshaft 26 is 120° CA ATDC (S220: YES), the CPU 72 acquires time T30[90], which is time required by the crankshaft 26 to rotate from 90° CA ATDC to 120° CA ATDC (S230). The number in brackets following T30 indicates the rotation angle of the crankshaft 26 at which the time T30 starts being measured.

Then, the CPU 72 subtracts the time T30[0] from the time T30[90] and substitutes the resultant for a rotation fluctuation amount $\Delta T30[n]$, which is related to the cylinder of which the compression top dead center has been detected by the process of S200 (S240). The rotation fluctuation amount $\Delta T30$ is a variable that has a negative value when misfires are not occurring in the cylinder subject to determination of misfires, and has a value close to 0 when misfires are occurring. The CPU 72 stores the rotation fluctuation amount $\Delta T30[n]$ in the memory device 75. Then, the CPU 72 reads from the memory device 75 a rotation fluctuation amount $\Delta T30[n-2]$ of the cylinder that reached the expansion stroke 360° CA earlier than the cylinder that has reached the expansion stroke and of which the compression top dead center has been detected by the process of S200 (S250). The rotation fluctuation amount $\Delta T30[n-2]$ is a value that was stored in the memory device 75 by the process of S240 that was executed 360° CA earlier. For the illustrative purposes, the number in brackets following $\Delta T30$ is a variable defined in the following manner in the present description. That is, the cylinder of which the compression top dead center is detected by the process of S200 is defined as an nth cylinder, and the number in brackets is decremented by 1 for each regression of the rotation angle as measured in 180° CA increments moving into the past from the present time. In the following description, the cylinder subject to determination of misfires will be referred to as a determination cylinder. Also, the cylinder that reaches the compression top dead center 360° CA earlier than the compression top dead center of the determination cylinder will be referred to as a reference cylinder.

As shown in FIG. 4, the CPU 72 then determines whether the single-cylinder fuel cut-off control is currently being executed (S260). When the single-cylinder fuel cut-off control is being executed (S260: YES), the CPU 72 determines whether the cylinders #2 and #3 are in the ATDC period (S270). When the cylinders #2 and #3 are in the ATDC period (S270: YES), the CPU 72 determines whether a fluctuation amount difference value, which is obtained by subtracting the rotation fluctuation amount $\Delta T30[n-2]$ from the rotation fluctuation amount $\Delta T30[n]$, is greater than or equal to a first determination threshold $\Delta th1$ (S280). When the single-cylinder fuel cut-off control is not being executed (S260: NO), the CPU 72 determines whether the fluctuation amount difference value, which is a value obtained by subtracting the rotation fluctuation amount $\Delta T30[n-2]$ from the rotation fluctuation amount $\Delta T30[n]$, is greater than or equal to the first determination threshold $\Delta th1$ (S280).

When the cylinders #2 and #3 are not in the ATDC period (S270: NO), the CPU 72 determines whether the cylinder #4 is in the ATDC period (S275). When the cylinder #4 is in the ATDC period (S275: YES), the CPU 72 determines whether the fluctuation amount difference value, obtained by subtracting the rotation fluctuation amount $\Delta T30[n-2]$ from the rotation fluctuation amount $\Delta T30[n]$, is greater than or equal to a second determination threshold $\Delta th2$, which is less than the first determination threshold $\Delta th1$ (S280).

In the present embodiment, instead of comparing the rotation fluctuation amount $\Delta T30[n]$ with a determination threshold, the extent of the relative difference between the rotation fluctuation amount $\Delta T30[n]$ and the rotation fluctuation amount $\Delta T30[n-2]$ is compared with the first determination threshold $\Delta th1$ or the second determination threshold $\Delta th2$. This configuration is employed to eliminate the influence of tolerances and the like of the spaces between the teeth 42 of the crank rotor 40. That is, the rotation fluctuation amount $\Delta T30[n]$ and the rotation fluctuation amount $\Delta T30[n-2]$ are displaced from each other by 360° CA. Thus, the tooth 42 that is referred to when the rotation fluctuation amount $\Delta T30[n]$ is calculated is the same as the tooth 42 that was referred to when the rotation fluctuation amount $\Delta T30[n-2]$ was calculated. Accordingly, if the spaces between the teeth 42 vary due to tolerances, the influence of the tolerances appear in the same manner in the rotation fluctuation amount $\Delta T30[n]$ and the rotation fluctuation amount $\Delta T30[n-2]$. Therefore, the influences of the tolerances are reduced by comparing the extent of the relative difference between the rotation fluctuation amount $\Delta T30[n]$ and the rotation fluctuation amount $\Delta T30[n-2]$ with the first determination threshold $\Delta th1$ or the second determination threshold $\Delta th2$.

The CPU 72 variably sets the first determination threshold $\Delta th1$ and the second determination threshold $\Delta th2$ using the rotation speed NE and the charging efficiency $\eta$ as inputs. Specifically, the CPU 72 sets the first determination threshold $\Delta th1$ and the second determination threshold $\Delta th2$ to greater values when the rotation speed NE is relatively low than when the rotation speed NE is relatively high. Also, the CPU 72 sets the first determination threshold $\Delta th1$ to a smaller value and the second determination threshold $\Delta th2$ to a greater value when the charging efficiency which is an index value of torque, is relatively low than when the charging efficiency $\eta$ is relatively high. The ROM 74 stores in advance map data having the rotation speed NE and the charging efficiency $\eta$ as input variables and the first determination threshold $\Delta th1$ and the second determination threshold $\Delta th2$ as output variables. The CPU 72 implements this process by obtaining the first determination threshold $\Delta th1$ and the second determination threshold $\Delta th2$ through map calculation.

The map data refers to a data set of discrete values of input variables and values of output variables each corresponding to a value of the input variables. When the value of an input variable agrees with any of the values of the input variable on the map data, the map calculation uses the value of the corresponding output variable on the map data as the calculation result. When the value of the input variable does not agree with any of the values of the input variable on the map data, the map calculation uses, as the calculation result, a value obtained through interpolation of multiple values of the output variable included in the map data set.

When the fluctuation amount difference value is greater than or equal to the first determination threshold $\Delta th1$ (S280:

YES) or when the fluctuation amount difference value is greater than or equal to the second determination threshold $\Delta th2$ (S285: YES), the CPU 72 determines that misfires are occurring in the determination cylinder and increments a counter Cn (S290). The counter Cn includes counters C1 to C4 respectively corresponding to the cylinders #1 to #4. The counters C1 to C4 are collectively referred to as the counter Cn. The CPU 72 executes the process of S300 when the process of S290 is completed, when the cylinder #4 is not in the ATDC period (S275: NO), when the fluctuation amount difference value is less than the first determination threshold $\Delta th1$ (S280: NO), or when the fluctuation amount difference value is less than the second determination threshold $\Delta th2$ (S285: NO). In S300, the CPU 72 determines whether a predetermined time has elapsed since the start of a consecutive misfire determination process for the determination cylinder. When the process of S280 or the process of S285 is executed for the first time since the start of the engine operation, the consecutive misfire determination process is executed for the first time since the start of the engine operation. Also, after the first consecutive misfire determination process since the start of the engine operation is finished, the process of S315, which will be discussed below, is executed. Thereafter, the consecutive misfire determination process is started again when the process of S280 or the process of S285 is executed for the first time. When the cylinder #4 is not in the ATDC period (S275: NO), the cylinder #1, which is a fuel cut-off cylinder, is in the ATDC period. In this case, the CPU 72 does not execute the processes of S280 to S290, and does not execute the determination of misfires in the cylinder #1. In this manner, when the fuel cut-off cylinder is the determination cylinder, the execution of the misfire determination is prohibited. Accordingly, misfires are not erroneously determined despite the fact that fuel supply to the determination cylinder has been stopped intentionally.

When the predetermined time has not elapsed (S300: NO), CPU 72 temporarily suspends the series of processes shown in FIGS. 3 and 4. On the other hand, when the predetermined time has elapsed (S300: YES), the CPU 72 determines whether the counter Cn is greater than or equal to a threshold Cnth (S310). The threshold Cnth is set in accordance with the number of times misfires occur within a predetermined amount of time when misfires are occurring consecutively in the determination cylinder. When the counter Cn is greater than or equal to the threshold Cnth (S310: YES), the CPU 72 determines that misfires are occurring consecutively in the determination cylinder (S320). That is, the CPU 72 determines the occurrence of consecutive misfires in the determination cylinder. Then, the CPU 72 operates a warning lamp 100 shown in FIG. 1 to execute a notification process to inform the user of the occurrence of consecutive misfires (S330). In contrast, when the counter Cn is less than the threshold Cnth (S310: NO), CPU 72 initializes the counter Cn (S315) and ends the consecutive misfire determination. The CPU 72 thus temporarily suspends the series of processes shown in FIGS. 3 and 4.

Figure 5:
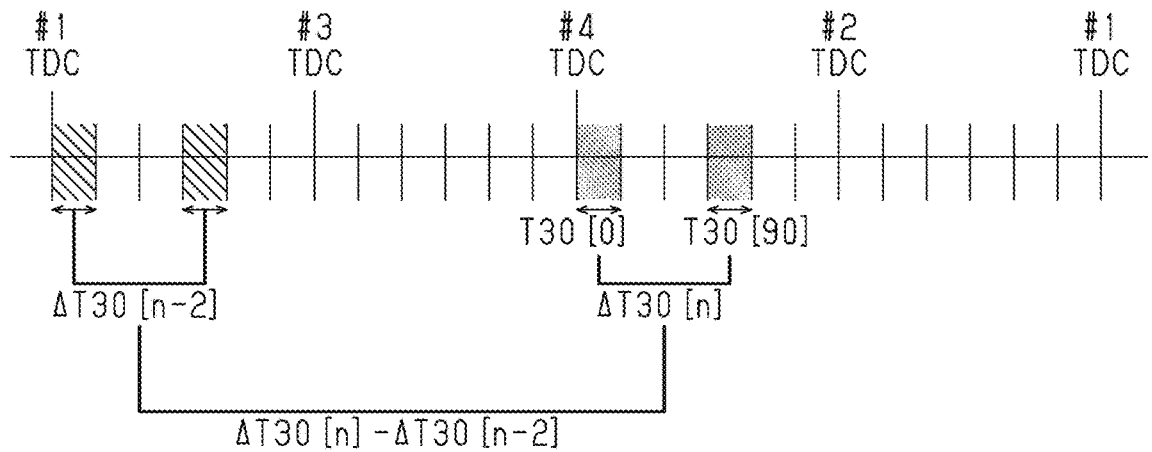
FIG. 5 is a diagram showing an order of ignition.

FIG. 5 is a diagram showing the order of ignition according to the present embodiment. As described above, the cylinder #1, the cylinder #3, the cylinder #4, and the cylinder #2 reach the expansion stroke in the order in the internal combustion engine 10. The cylinder #1 is the fuel cut-off cylinder, and the cylinder #2, the cylinder #3, and the cylinder #4 are the combustion cylinders. If misfires are not occurring in any of the combustion cylinders, the time T30[90] has a value less than the value of the time T30[0]. Accordingly, the rotation fluctuation amount $\Delta T30$ has a negative value. On the other hand, if misfires are occurring in any of the combustion cylinders, the time T30[90] has a value substantially equal to the value of the time T30[0]. Accordingly, the rotation fluctuation amount $\Delta T30$ has a value substantially equal to 0. Also, since combustion is not performed in the fuel cut-off cylinder, the rotation fluctuation amount is substantially equal to that in a case in which misfires are occurring. Accordingly, the rotation fluctuation amount $\Delta T30$ has a value substantially equal to 0. That is, in a case in which the cylinder #2 and the cylinder #3 are the determination cylinders, the cylinder #2 and the cylinder #3 are both combustion cylinders. Thus, the reference cylinder, which reaches the expansion stroke 360° CA earlier than the determination cylinder, is always a combustion cylinder. Therefore, even in a case in which misfires are not occurring in the determination cylinders, the fluctuation amount difference value is a value close to 0. In contrast, in a case in which misfires are occurring either in the cylinder #2 or the cylinder #3, which are the determination cylinders, the fluctuation amount difference value is a positive value and its absolute value is relatively large. Thus, the first determination threshold $\Delta th1$ is set to a positive value having such a magnitude that misfires are determined to be occurring in a determination cylinder when the fluctuation amount difference value is greater than or equal to the first determination threshold $\Delta th1$, and that no misfires are determined to be occurring in the determination cylinder when the fluctuation amount difference value is less than the first determination threshold $\Delta th1$. On the other hand, when the cylinder #4 is the determination cylinder, the cylinder #1, which is the fuel cut-off cylinder, is the reference cylinder. Thus, if misfires are not occurring in the determination cylinder, the fluctuation amount difference value is a negative value and its absolute value is relatively large. In contrast, when misfires occur in the determination cylinder, the fluctuation amount difference value is a value close to 0. Thus, the second determination threshold $\Delta th2$ is set to a negative value having such a magnitude that misfires are determined to be occurring in a determination cylinder when the fluctuation amount difference value is greater than or equal to the second determination threshold $\Delta th2$, and that no misfires are determined to be occurring in the determination cylinder when the fluctuation amount difference value is less than the second determination threshold $\Delta th2$. Therefore, the second determination threshold $\Delta th2$ is less than the first determination threshold $\Delta th1$ as described above. As described above, the controller 70 determines whether a misfire condition is satisfied using the first determination threshold $\Delta th1$, which is a determination threshold, when the reference cylinder is a combustion cylinder. On the other hand, when the reference cylinder is a fuel cut-off cylinder, the determination threshold is changed to the second determination threshold $\Delta th2$ to determine whether the misfire condition is satisfied. That is, when the reference cylinder is a fuel cut-off cylinder, the controller 70 determines whether the misfire condition is satisfied after correcting the determination threshold to the second determination threshold $\Delta th2$, which is less than the first determination threshold $\Delta th1$.

An operation and advantages of the present embodiment will now be described.

When the air-fuel ratio $\Delta Fr$ is less than or equal to the single-cylinder fuel cut-off execution value AF1, the CPU 72 executes the single-cylinder fuel cut-off control. Accordingly, the air drawn into the cylinder #1 during the intake stroke is not used for combustion, but is discharged to the exhaust passage during the exhaust stroke of the cylinder #1.

The air-fuel mixture in the cylinders #2 to #4 is burned at the stoichiometric air-fuel ratio. Thus, when the three-way catalyst 32 is in a rich state, oxygen is supplied to the three-way catalyst 32 without discharging NOx due to lean combustion. This ends the rich state of the three-way catalyst 32.

In a case in which the cylinder #2 and the cylinder #3, which are combustion cylinders, are the determination cylinders, the reference cylinder, which reaches the expansion stroke 360° CA earlier than a determination cylinder, is also a combustion cylinder. Thus, the CPU 72 determines that misfires are occurring when the fluctuation amount difference value is greater than or equal to the first determination threshold Δth1. In a case in which the cylinder #4, which is a combustion cylinder, is the determination cylinder, the cylinder #1, which a fuel cut-off cylinder, is the reference cylinder. Thus, the CPU 72 determines that misfires are occurring when the fluctuation amount difference value is greater than or equal to the second determination threshold Δth2. At this time, the second determination threshold Δth2 is less than the first determination threshold Δth1. Thus, when the reference cylinder is a fuel cut-off cylinder, the fluctuation amount difference value is not erroneously determined to be less than the determination threshold even if misfires occur in the determination cylinder so that the fluctuation amount difference value decreases. That is, with the above-described configuration, when the fuel cut-off cylinder is the reference cylinder, a correcting process is executed to execute correction for reducing the influence of the fact that the reference cylinder is a fuel cut-off cylinder. Thus, even if the reference cylinder is a fuel cut-off cylinder, the influence on the misfire determination is reduced by the correcting process.

The present embodiment described above further has the following operations and advantages.

(1-1) The CPU 72 sets the first determination threshold Δth1 and the second determination threshold Δth2 to greater values when the rotation speed NE is relatively low than when the rotation speed NE is relatively high. As the rotation speed NE decreases, the detection time of the rotation angle required to calculate the time T30 is extended, and the width of error of the rotation fluctuation amount ΔT30 increases. In this regard, with the above-described configuration, the first determination threshold Δth1 and the second determination threshold Δth2 are increased as the rotation speed NE decreases. Accordingly, the fluctuation amount difference value is unlikely to be erroneously determined to be greater than or equal to the determination threshold. That is, the occurrence of misfires is unlikely to be erroneously determined even if the rotation speed NE is relatively low and the width of error of the rotation fluctuation amount is relatively large.

(1-2) The CPU 72 sets the first determination threshold Δth1 to a smaller value and the second determination threshold Δth2 to a greater value when the charging efficiency η is relatively low than when the charging efficiency η is relatively high. As the charging efficiency η decreases, the rotation fluctuation amount ΔT30 in a state in which misfires are not occurring increases, since the rotation fluctuation is relatively small. When misfires occur in the determination cylinder, and the reference cylinder is a combustion cylinder, the fluctuation amount difference value decreases as the charging efficiency η decreases. In this regard, the above-described configuration sets the first determination threshold Δth1 to a smaller value as the charging efficiency η decreases. Accordingly, the rotation fluctuation amount is unlikely to be erroneously determined to be less than the first determination threshold Δth1 even in a case in which the rotation fluctuation amount is relatively small. Also, when misfires are not occurring in the determination cylinder, and the reference cylinder is a fuel cut-off cylinder, the fluctuation amount difference value increases as the charging efficiency decreases. In this regard, the above-described configuration sets the second determination threshold Δth2 to a greater value as the charging efficiency η decreases. Accordingly, the rotation fluctuation amount is unlikely to be erroneously determined to be greater than or equal to the second determination threshold Δth2 even in a case in which the rotation fluctuation amount is relatively small. That is, the occurrence of misfires is unlikely to be erroneously determined even if the charging efficiency is relatively low and the fluctuation amount difference value is relatively large.

Second Embodiment

A second embodiment will now be described with reference to FIGS. 6 and 7. Differences from the first embodiment will mainly be discussed.

In the second embodiment, when it is determined whether misfires are occurring in the cylinder #4, the rotation fluctuation amount ΔT30[n−2] read from the memory device 75 is corrected to a rotation fluctuation amount ΔT30'[n−2], which corresponds to the rotation fluctuation amount ΔT30[n−2] obtained after the compression top dead center of the cylinder #2 and the cylinder #3, which are combustion cylinders. After the correction is performed, whether misfires are occurring in the cylinder #4 is determined based on whether the fluctuation amount difference value, which is obtained by subtracting the rotation fluctuation amount ΔT30[n−2] from the rotation fluctuation amount ΔT30[n], is greater than the first determination threshold Δth1.

Figure 6:
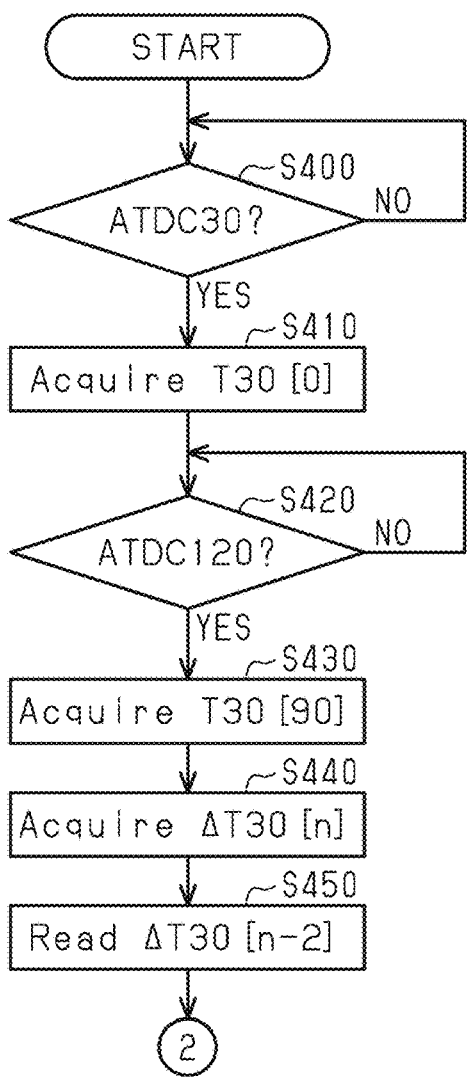
FIG. 6 is a flowchart showing a procedure of a process related to detection of misfires according to a second embodiment.
Figure 7:
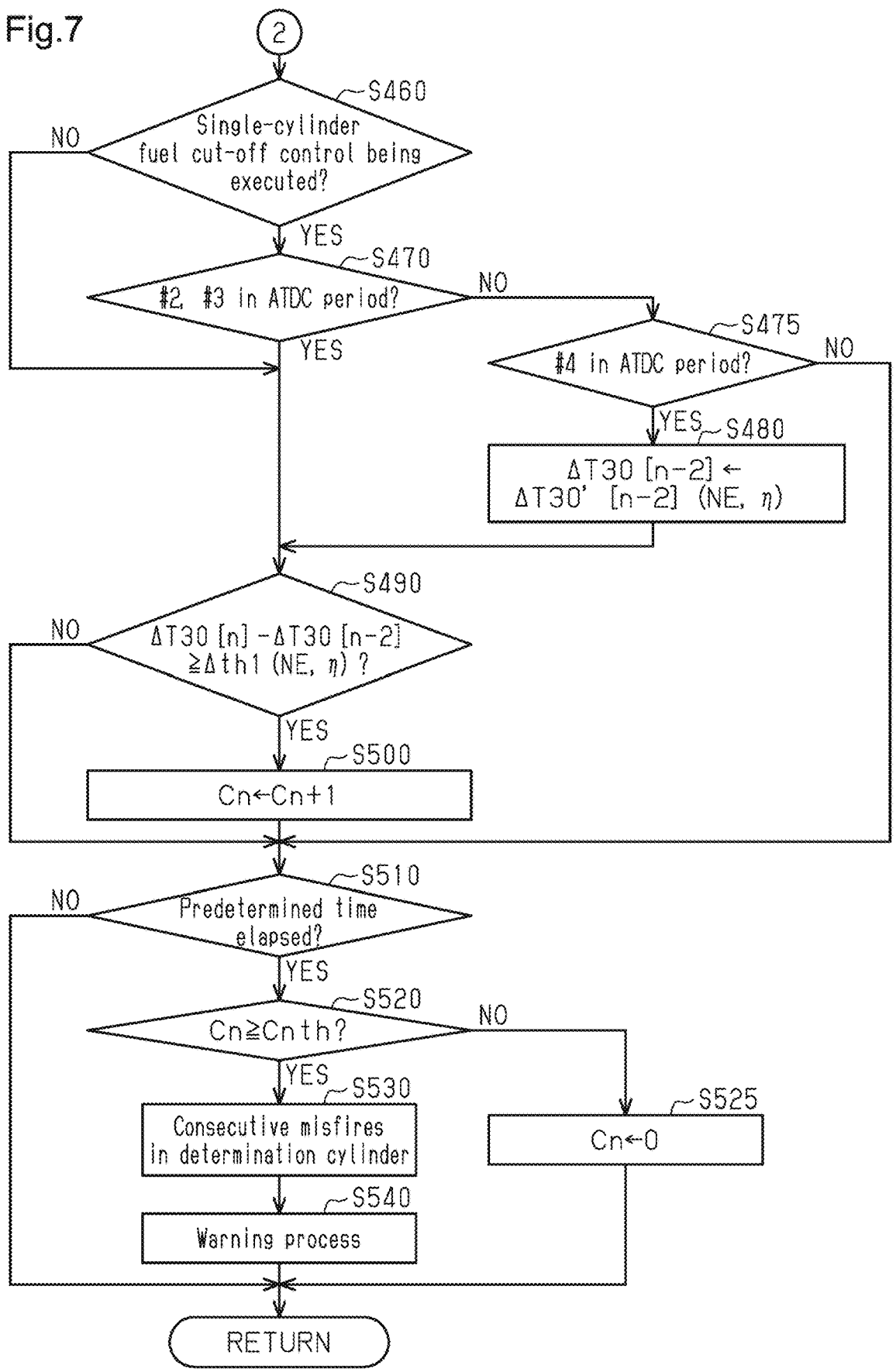
FIG. 7 is a flowchart showing a procedure of the process related to detection of misfires according to the second embodiment.

FIGS. 6 and 7 show the procedure of processes executed by the controller 70. The controller 70 according to the second embodiment executes the series of processes shown in FIGS. 6 and 7 in place of the series of processes described with reference to FIGS. 3 and 4. The process shown in FIGS. 6 and 7 is implemented by the CPU 72 repeatedly executing programs stored in the ROM 74 at a predetermined interval. FIGS. 6 and 7 show a procedure in which the cylinder #1, the cylinder #3, the cylinder #4, and the cylinder #2 reach the combustion stroke in the order, and the cylinder #1 is a fuel cut-off cylinder. When the cylinder #2, the cylinder #3, and the cylinder #4 are each a fuel cut-off cylinder, the cylinder numbers are replaced as necessary.

In the series of processes shown in FIGS. 6 and 7, the CPU 72 first determines whether the current rotation angle of the crankshaft 26 is 30° CA after top dead center (ATDC) with respect to the compression top dead center of any of the cylinders #1 to #4 (S400). When the current rotation angle of the crankshaft 26 is not 30° CA ATDC (S400: NO), the CPU 72 stands by until the current rotation angle is 30° CA ATDC. When the current rotation angle of the crankshaft 26 is 30° CA ATDC (S400: YES), the CPU 72 acquires time T30[0], which is time required by the crankshaft 26 to rotate 30° CA from the compression top dead center (S410). Next, the CPU 72 determines whether the current rotation angle of the crankshaft 26 is 120° CA ATDC (S420). When the current rotation angle of the crankshaft 26 is not 120° CA ATDC (S420: NO), the CPU 72 stands by until the current rotation angle is 120° CA ATDC. When the current rotation angle of the crankshaft 26 is 120° CA ATDC (S420: YES), the CPU 72 acquires time T30[90], which is time required by the crankshaft 26 to rotate from 90° CA ATDC to 120° CA ATDC (S430). The number in brackets following T30 indicates the rotation angle of the crankshaft 26 at which the time T30 starts being measured.

Then, the CPU 72 subtracts the time T30[0] from the time T30[90] and substitutes the resultant for a rotation fluctuation amount $\Delta T30[n]$, which is related to the cylinder of which the compression top dead center has been detected by the process of S400 (S440). The rotation fluctuation amount $\Delta T30$ is a variable that has a negative value when misfires are not occurring in the cylinder subject to determination of misfires, and has a value close to 0 when misfires are occurring. The CPU 72 stores the rotation fluctuation amount $\Delta T30[n]$ in the memory device 75. Then, the CPU 72 reads from the memory device 75 a rotation fluctuation amount $\Delta T30[n-2]$ of the cylinder that reached the expansion stroke 360° CA earlier than the cylinder that has reached the expansion stroke and of which the compression top dead center has been detected by the process of S400 (S450). The rotation fluctuation amount $\Delta T30[n-2]$ is a value that was stored in the memory device 75 by the process of S440 that was executed 360° CA earlier. For the illustrative purposes, the number in brackets following $\Delta T30$ is a variable defined in the following manner in the present description. That is, the cylinder of which the compression top dead center is detected by the process of S400 is defined as an nth cylinder, and the number in brackets is decremented by 1 for each regression of the rotation angle as measured in 180° CA increments moving into the past from the present time. In the following description, the cylinder subject to determination of misfires will be referred to as a determination cylinder. Also, the cylinder that reaches the compression top dead center 360° CA earlier than the compression top dead center of the determination cylinder will be referred to as a reference cylinder.

As shown in FIG. 7, the CPU 72 then determines whether the single-cylinder fuel cut-off control is currently being executed (S460). When the single-cylinder fuel cut-off control is being executed (S460: YES), the CPU 72 determines whether the cylinders #2 and #3 are in the ATDC period (S470). When the cylinders #2 and #3 are not in the ATDC period (S470: NO), the CPU 72 determines whether the cylinder #4 is in the ATDC period (S475). When the cylinder #4 is in the ATDC period (S475: YES), the CPU 72 corrects the rotation fluctuation amount $\Delta T30[n-2]$ to the rotation fluctuation amount $\Delta T30'[n-2]$(S480). The rotation fluctuation amount $\Delta T30[n-2]$ corresponds to the rotation fluctuation amount $\Delta T30[n-1]$ or the rotation fluctuation amount $\Delta T30[n-3]$ that are obtained during the ATDC period of the cylinder #2 and the cylinder #3, which are combustion cylinders. The rotation fluctuation amount $\Delta T30[n-2]$ is read from the memory device 75 in S450 and obtained during the ATDC period of the cylinder #1, which is a fuel cut-off cylinder. When executing the process of S480, the CPU 72 determines whether the fluctuation amount difference value, which is a value obtained by subtracting the rotation fluctuation amount $\Delta T30[n-2]$ from the rotation fluctuation amount $\Delta T30[n]$, is greater than or equal to the first determination threshold $\Delta th1$ (S490). Also, when the single-cylinder fuel cut-off control is not being executed (S460: NO) or when the cylinders #2 and #3 are in the ATDC period (S470: YES), the CPU 72 determines whether the fluctuation amount difference value, which is a value obtained by subtracting the rotation fluctuation amount $\Delta T30[n-2]$ from the rotation fluctuation amount $\Delta T30[n]$, is greater than or equal to the first determination threshold $\Delta th1$ (S490). The rotation fluctuation amount $\Delta T30[n]$ and the rotation fluctuation amount $\Delta T30[n-2]$ have similar values when misfires are not occurring in the cylinder subject to determination of misfire. Accordingly, the result of the subtraction is a value close to 0. In contrast, in a case in which misfires are occurring in the cylinder subject to determination of misfire, the subtraction result is a positive value and its absolute value is relatively large. The first determination threshold $\Delta th1$ is set to a positive value having such a magnitude that misfires are determined to be occurring in a determination cylinder when the fluctuation amount difference value is greater than or equal to the first determination threshold $\Delta th1$, and that no misfires are determined to be occurring in the determination cylinder when the fluctuation amount difference value is less than the first determination threshold $\Delta th1$.

The CPU 72 variably sets the first determination threshold $\Delta th1$ using the charging efficiency $\eta$, which is an index value of torque, as an input. Specifically, the CPU 72 sets the first determination threshold $\Delta th1$ to a smaller value when the charging efficiency $\eta$ is relatively low than when the charging efficiency $\eta$ is relatively high. The ROM 74 stores in advance map data having the charging efficiency $\eta$ as an input variable and the first determination threshold $\Delta th1$ as an output variable. The CPU 72 implements this process by obtaining the first determination threshold $\Delta th1$ through map calculation.

The CPU 72 also variably sets the rotation fluctuation amount $\Delta T30'[n-2]$ using the charging efficiency $\eta$ as an input. Specifically, the CPU 72 sets the rotation fluctuation amount $\Delta T30[n-2]$ to a greater value when the charging efficiency $\eta$ is relatively low than when the charging efficiency $\eta$ is relatively high. The ROM 74 stores in advance map data having the charging efficiency $\eta$ as an input variable and the rotation fluctuation amount $\Delta T30[n-2]$ as an output variable. The CPU 72 implements this process by obtaining the rotation fluctuation amount $\Delta T30[n-2]$ through map calculation.

The map data refers to a data set of discrete values of input variables and values of output variables each corresponding to a value of the input variables. When the value of an input variable agrees with any of the values of the input variable on the map data, the map calculation uses the value of the corresponding output variable on the map data as the calculation result. When the value of the input variable does not agree with any of the values of the input variable on the map data, the map calculation uses, as the calculation result, a value obtained through interpolation of multiple values of the output variable included in the map data set.

When the fluctuation amount difference value is greater than or equal to the first determination threshold $\Delta th1$ (S490: YES), the CPU 72 determines that misfires are occurring in the determination cylinder and increments the counter Cn (S500). The counter Cn includes counters C1 to C4 respectively corresponding to the cylinders #1 to #4. The counters C1 to C4 are collectively referred to as the counter Cn. The CPU 72 executes the process of S510 when the process of S500 is completed, when the cylinder #4 is not in the ATDC period (S475: NO), or when the fluctuation amount difference value is less than the first determination threshold $\Delta th1$ (S490: NO). In S510, the CPU 72 determines whether a predetermined time has elapsed since the start of a consecutive misfire determination process for the determination cylinder. When the process of S490 is executed for the first time since the start of the engine operation, the consecutive misfire determination process is executed for the first time since the start of the engine operation. Also, after the first consecutive misfire determination process since the start of the engine operation is finished, the process of S525, which will be discussed below, is executed. Thereafter, the consecutive misfire determination process is started again when the process of S490 is executed for the first time. When the cylinder #4 is not in the ATDC period (S475: NO), the cylinder #1, which is a fuel cut-off cylinder, is in the ATDC period. In this case, the CPU 72 does not execute the processes of S480 to S500, and does not execute the determination of misfires in the cylinder #1.

When the predetermined time has not elapsed (S510: NO), CPU 72 temporarily suspends the series of processes shown in FIGS. 6 and 7. On the other hand, when the predetermined time has elapsed (S510: YES), the CPU 72 determines whether the counter Cn is greater than or equal to a threshold Cnth (S520). The threshold Cnth is set in accordance with the number of times misfires occur within a predetermined amount of time when misfires are occurring consecutively in the determination cylinder. When the counter Cn is greater than or equal to the threshold Cnth (S520: YES), the CPU 72 determines that misfires are occurring consecutively in the determination cylinder (S530). That is, the CPU 72 determines the occurrence of consecutive misfires in the determination cylinder. Then, the CPU 72 operates a warning lamp 100 shown in FIG. 1 to execute a notification process to inform the user of the occurrence of consecutive misfires (S540). In contrast, when the counter Cn is less than the threshold Cnth (S520: NO), CPU 72 initializes the counter Cn (S525) and ends the consecutive misfire determination. The CPU 72 thus temporarily suspends the series of processes shown in FIGS. 6 and 7.

An operation and advantages of the second embodiment will now be described.

In a case in which the cylinder #4 is the determination cylinder, the cylinder #1, which a fuel cut-off cylinder, is the reference cylinder. Thus, the CPU 72 corrects the rotation fluctuation amount $\Delta T30[n-2]$ to the rotation fluctuation amount $\Delta T30'[n-2]$, which corresponds to the rotation fluctuation amount $\Delta T30[n-1]$ or the rotation fluctuation amount $\Delta T30[n-3]$, which are obtained during the ATDC period of the cylinder #2 and the cylinder #3, which are the combustion cylinders. At this time, the CPU 72 determines that misfires are occurring when the fluctuation amount difference value, which is a value obtained by subtracting the rotation fluctuation amount $\Delta T30[n-2]$ from the rotation fluctuation amount $\Delta T30[n]$, is greater than or equal to the first determination threshold $\Delta$th1.

The rotation fluctuation amount $\Delta T30$ that has been obtained in the ATDC period of the fuel cut-off cylinder has a value substantially equal to 0. On the other hand, the rotation fluctuation amount $\Delta T30$ that has been obtained in the ATDC period of the combustion cylinder has a negative value. Since the controller 70 according to the second embodiment corrects the rotation fluctuation amount $\Delta T[n-2]$, the corrected rotation fluctuation amount $\Delta T30$ has a negative value even in a case in which the reference cylinder is a fuel cut-off cylinder. Thus, even if misfires are occurring in the determination cylinder, the fluctuation amount difference value does not become a value substantially equal to 0, but becomes a positive value. Accordingly, the fluctuation amount difference value is unlikely to be erroneously determined to be less than the first determination threshold $\Delta$th1.

That is, with the above-described configuration, the second rotation fluctuation amount in a case in which the reference cylinder is a fuel cut-off cylinder is corrected to a value equivalent to the second rotation fluctuation amount in a case in which the reference cylinder is a combustion cylinder. This reduces the influence of stopping of fuel supply on the fluctuation amount difference value even if the reference cylinder is a fuel cut-off cylinder. Therefore, even if the reference cylinder is a fuel cut-off cylinder, it is possible to determine whether the misfire condition is satisfied using the same criteria as the case in which the reference cylinder is a combustion cylinder. Thus, according to the above-described configuration, the correcting process reduces the influence of the reference cylinder being a fuel cut-off cylinder on the misfire determination result.

The second embodiment described above further has the following operations and advantages.

(2-1) The CPU 72 sets the first determination threshold $\Delta$th1 to a smaller value when the charging efficiency $\eta$ is relatively low than when the charging efficiency $\eta$ is relatively high. As the charging efficiency $\eta$ decreases, the rotation fluctuation amount $\Delta T30$ in a state in which misfires are not occurring increases, since the rotation fluctuation is relatively small. When misfires occur in the determination cylinder, and the reference cylinder is a combustion cylinder, the fluctuation amount difference value decreases as the charging efficiency $\eta$ decreases. In this regard, the above-described configuration sets the first determination threshold $\Delta$th1 to a smaller value as the charging efficiency $\eta$ decreases. Accordingly, the rotation fluctuation amount is unlikely to be erroneously determined to be less than the first determination threshold $\Delta$th1 even in a case in which the rotation fluctuation amount is relatively small.

(2-2) The CPU 72 sets the rotation fluctuation amount $\Delta T30[n-2]$ to a greater value when the charging efficiency $\eta$ is relatively low than when the charging efficiency $\eta$ is relatively high. As the charging efficiency $\eta$ decreases, the rotation fluctuation amount $\Delta T30$ in the combustion cylinder increases. In this respect, the above-described configuration sets the rotation fluctuation amount $\Delta T30'[n-2]$ to a greater value when the charging efficiency $\eta$ is relatively low than when the charging efficiency $\eta$ is relatively high. Thus, the fluctuation amount difference value is unlikely to be erroneously determined to be less than the first determination threshold. The fluctuation amount difference value is obtained by subtracting, from the rotation fluctuation amount $\Delta T30[n]$, the rotation fluctuation amount $\Delta T30[n-2]$, which has been corrected to the rotation fluctuation amount $\Delta T30'[n-2]$.

Third Embodiment

A third embodiment will now be described with reference to the drawings. The differences from the first embodiment will mainly be discussed.

In the third embodiment, whether misfires are occurring in the cylinders #1 to #4 is determined by using an angular velocity, which is the reciprocal of the time until 30° CA is reached, to calculate the rotation fluctuation amount or the fluctuation amount difference value.

Figure 8:
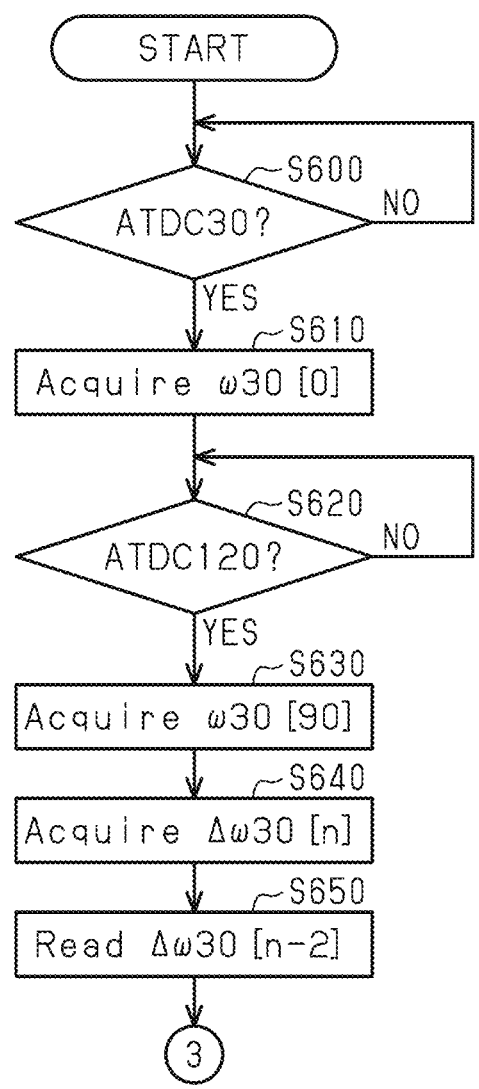
FIG. 8 is a flowchart showing a procedure of a process related to detection of misfires according to a third embodiment.
Figure 9:
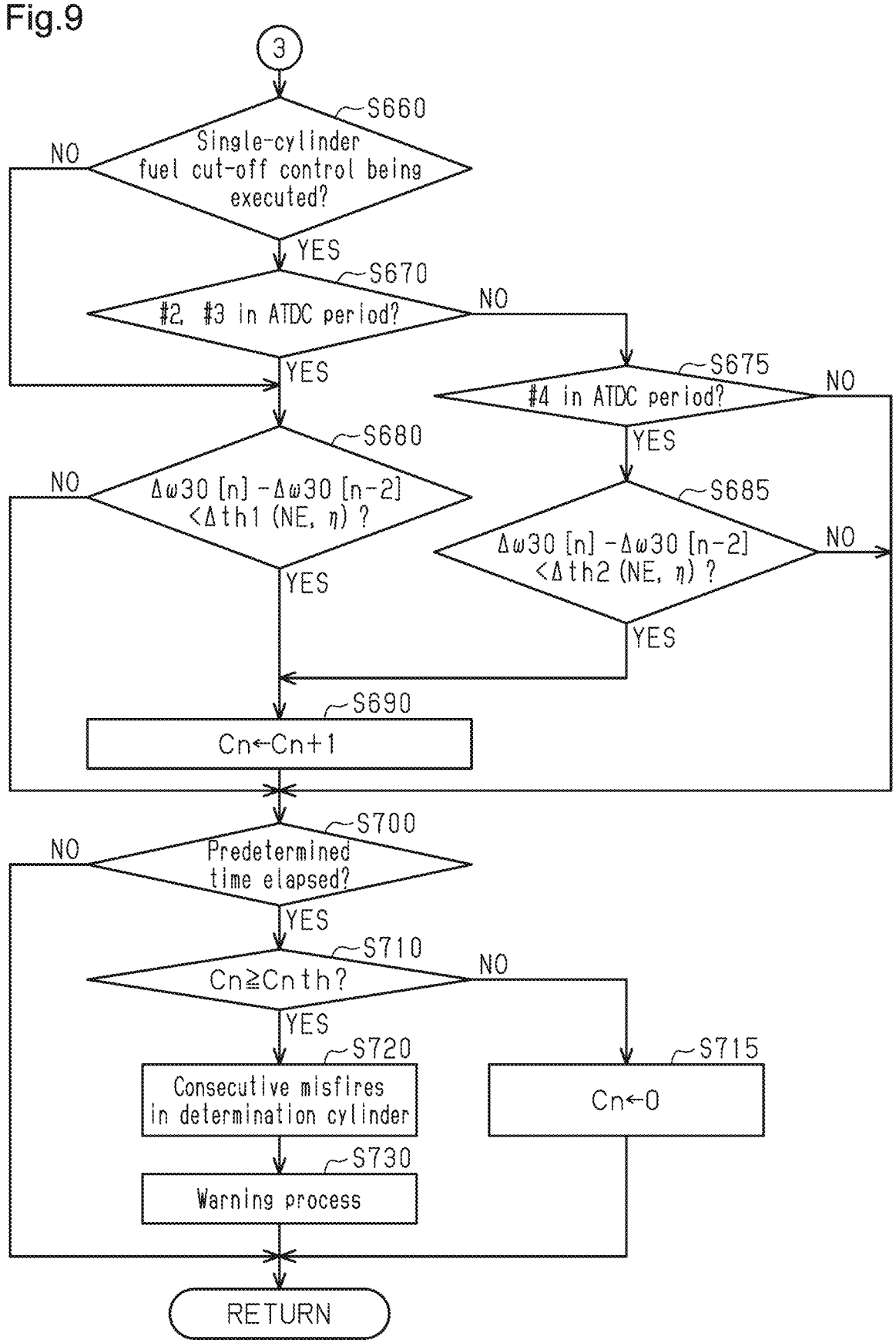
FIG. 9 is a flowchart showing a procedure of the process related to detection of misfires according to the third embodiment.

FIGS. 8 and 9 show another process executed by the controller 70. The controller 70 according to the third embodiment executes the series of processes shown in FIGS. 8 and 9 in place of the series of processes described with reference to FIGS. 3 and 4. The process shown in FIGS. 8 and 9 is implemented by the CPU 72 repeatedly executing programs stored in the ROM 74 at a predetermined interval. FIGS. 8 and 9 show a procedure in which the cylinder #1, the cylinder #3, the cylinder #4, and the cylinder #2 reach the combustion stroke in the order, and the cylinder #1 is a fuel cut-off cylinder. When the cylinder #2, the cylinder #3, and the cylinder #4 are each a fuel cut-off cylinder, the cylinder numbers are replaced as necessary.

In the series of processes shown in FIGS. 8 and 9, the CPU 72 first determines whether the current rotation angle of the crankshaft 26 is 30° CA after top dead center (ATDC) with respect to the compression top dead center of any of the cylinders #1 to #4 (S600). When the current rotation angle of the crankshaft 26 is not 30° CA ATDC (S600: NO), the CPU 72 stands by until the current rotation angle is 30° CA ATDC. When the current rotation angle of the crankshaft 26 is 30° CA ATDC (S600: YES), the CPU 72 acquires an angular velocity ω30[0], which is the reciprocal of the time required by the crankshaft 26 to rotate 30CA° from the compression top dead center (S610). Next, the CPU 72 determines whether the current rotation angle of the crankshaft 26 is 120° CA ATDC (S620). When the current rotation angle of the crankshaft 26 is not 120° CA ATDC (S620: NO), the CPU 72 stands by until the current rotation angle is 120° CA ATDC. When the current rotation angle of the crankshaft 26 is 120° CA ATDC (S620: YES), the CPU 72 acquires an angular velocity ω30[90], which is the reciprocal of the time required by the crankshaft 26 to rotate from 90° CA ATDC to 120° CA ATDC (S630). The number in brackets following ω30 indicates the rotation angle of the crankshaft 26 at which the angular velocity ω30 starts being measured.

Then, the CPU 72 subtracts the angular velocity ω30[0] from the angular velocity ω[90] and substitutes the resultant for a rotation fluctuation amount Δω30[n] related to the cylinder of which the compression top dead center has been detected by the process of S600 (S640). The rotation fluctuation amount Δω30 is a variable that has a negative value when misfires are not occurring in the cylinder subject to determination of misfires, and has a value close to 0 when misfires are occurring. The CPU 72 stores the rotation fluctuation amount Δω30[n] in the memory device 75. Then, the CPU 72 reads from the memory device 75 a rotation fluctuation amount Δω30[n−2] of the cylinder that reached the expansion stroke 360° CA earlier than the cylinder that has reached the expansion stroke and of which the compression top dead center has been detected by the process of S600 (S650). The rotation fluctuation amount Δω30[n−2] is a value that was stored in the memory device 75 by the process of S640 that was executed 360° CA earlier. For the illustrative purposes, the number in brackets following ΔT30 is a variable defined in the following manner in the present description. That is, the cylinder of which the compression top dead center is detected by the process of S600 is defined as an nth cylinder, and the number in brackets is decremented by 1 for each regression of the rotation angle as measured in 180° CA increments moving into the past from the present time. In the following description, the cylinder subject to determination of misfires will be referred to as a determination cylinder. Also, the cylinder that reaches the compression top dead center 360° CA earlier than the compression top dead center of the determination cylinder will be referred to as a reference cylinder.

As shown in FIG. 9, the CPU 72 then determines whether the single-cylinder fuel cut-off control is currently being executed (S660). When the single-cylinder fuel cut-off control is being executed (S660: YES), the CPU 72 determines whether the cylinders #2 and #3 are in the ATDC period (S670). When the cylinders #2 and #3 are in the ATDC period (S670: YES) or when the single-cylinder fuel cut-off control is not being executed (S660: NO), the CPU 72 determines whether a fluctuation amount difference value, which is obtained by subtracting the rotation fluctuation amount Δω30[n−2] from the rotation fluctuation amount Δω30[n], is less than the first determination threshold Δth1 (S680). The angular velocity ω30 is the reciprocal of the time T30, which is required by the crankshaft 26 to rotate 30° CA. Thus, even in a case in which misfires are not occurring in the determination cylinders, the fluctuation amount difference value is a value close to 0. In contrast, in a case in which misfires are occurring in the determination cylinder, the fluctuation amount difference value is a negative value and its absolute value is relatively large. Thus, the first determination threshold Δth1 is set to a negative value having such a magnitude that misfires are determined to be occurring in a determination cylinder when the fluctuation amount difference value is less the first determination threshold Δth1, and that no misfires are determined to be occurring in the determination cylinder when the fluctuation amount difference value is greater than or equal to the first determination threshold Δth1.

When the cylinders #2 and #3 are not in the ATDC period (S670: NO), the CPU 72 determines whether the cylinder #4 is in the ATDC period (S675). When the cylinder #4 is in the ATDC period (S675: YES), the CPU 72 determines whether the fluctuation amount difference value, which is obtained by subtracting the rotation fluctuation amount Δω30[n−2] from the rotation fluctuation amount Δω30[n], is less than the second determination threshold Δth2, which has been corrected to a value greater than the first determination threshold Δth1 (S685). In a case in which misfires are not occurring in the determination cylinder, the fluctuation amount difference value is a positive value and its absolute value is relatively large. In contrast, when misfires occur in the determination cylinder, the fluctuation amount difference value is a value close to 0. Thus, the second determination threshold Δth2 is set to a positive value having such a magnitude that misfires are determined to be occurring in a determination cylinder when the fluctuation amount difference value is less the second determination threshold Δth2, and that no misfires are determined to be occurring in the determination cylinder when the fluctuation amount difference value is greater than or equal to the second determination threshold Δth2.

The CPU 72 variably sets the first determination threshold Δth1 and the second determination threshold Δth2 using the rotation speed NE and the charging efficiency η as inputs. Specifically, the CPU 72 sets the first determination threshold Δth1 and the second determination threshold Δth2 to smaller values when the rotation speed NE is relatively low than when the rotation speed NE is relatively high. Also, the CPU 72 sets the first determination threshold Δth1 to a greater value and the second determination threshold Δth2 to a smaller value when the charging efficiency η is relatively high than when the charging efficiency η is relatively low. The ROM 74 stores in advance map data having the rotation speed NE and the charging efficiency η as input variables and the first determination threshold Δth1 and the second determination threshold Δth2 as output variables. The CPU 72 implements this process by obtaining the first determination threshold Δth1 and the second determination threshold Δth2 through map calculation.

The map data refers to a data set of discrete values of input variables and values of output variables each corresponding to a value of the input variables. When the value of an input variable agrees with any of the values of the input variable on the map data, the map calculation uses the value of the corresponding output variable on the map data as the calculation result. When the value of the input variable does not agree with any of the values of the input variable on the map data, the map calculation uses, as the calculation result, a value obtained through interpolation of multiple values of the output variable included in the map data set.

When the fluctuation amount difference value is less than the first determination threshold $\Delta th1$ (S680: YES) or when the fluctuation amount difference value is less than the second determination threshold $\Delta th2$ (S685: YES), the CPU 72 determines that misfires are occurring in the determination cylinder and increments the counter Cn (S690). The counter Cn includes counters C1 to C4 respectively corresponding to the cylinders #1 to #4. The counters C1 to C4 are collectively referred to as the counter Cn. The CPU 72 executes the process of S700 when the process of S690 is completed, when the cylinder #4 is not in the ATDC period (S675: NO), when the fluctuation amount difference value is greater than or equal to the first determination threshold $\Delta th1$ (S680: NO), or when the fluctuation amount difference value is greater than or equal to the second determination threshold $\Delta th2$ (S685: NO). In S700, the CPU 72 determines whether a predetermined time has elapsed since the start of a consecutive misfire determination process for the determination cylinder. When the process of S680 or the process of S685 is executed for the first time since the start of the engine operation, the consecutive misfire determination process is executed for the first time since the start of the engine operation. Also, after the first consecutive misfire determination process since the start of the engine operation is finished, the process of S715, which will be discussed below, is executed. Thereafter, the consecutive misfire determination process is started again when the process of S680 or the process of S685 is executed for the first time. When the cylinder #4 is not in the ATDC period (S675: NO), the cylinder #1, which is a fuel cut-off cylinder, is in the ATDC period. In this case, the CPU 72 does not execute the processes of S680 to S690, and does not execute the determination of misfires in the cylinder #1.

When the predetermined time has not elapsed (S700: NO), CPU 72 temporarily suspends the series of processes shown in FIGS. 8 and 9. On the other hand, when the predetermined time has elapsed (S700: YES), the CPU 72 determines whether the counter Cn is greater than or equal to a threshold Cnth (S710). The threshold Cnth is set in accordance with the number of times misfires occur within a predetermined amount of time when misfires are occurring consecutively in the determination cylinder. When the counter Cn is greater than or equal to the threshold Cnth (S710: YES), the CPU 72 determines that misfires are occurring consecutively in the determination cylinder (S720). That is, the CPU 72 determines the occurrence of consecutive misfires in the determination cylinder. Then, the CPU 72 operates a warning lamp 100 shown in FIG. 1 to execute a notification process to inform the user of the occurrence of consecutive misfires (S730). In contrast, when the counter Cn is less than the threshold Cnth (S710: NO), CPU 72 initializes the counter Cn (S715) and ends the consecutive misfire determination. The CPU 72 thus temporarily suspends the series of processes shown in FIGS. 8 and 9.

An operation and advantages of the third embodiment will now be described.

In a case in which the cylinder #2 and the cylinder #3, which are combustion cylinders, are the determination cylinders, the reference cylinder, which reaches the expansion stroke 360° CA earlier than a determination cylinder, is also a combustion cylinder. Thus, the CPU 72 determines that misfires are occurring when the fluctuation amount difference value is less than the first determination threshold $\Delta th1$. Also, in a case in which the cylinder #4, which is a combustion cylinder, is the determination cylinder, the cylinder #1, which a fuel cut-off cylinder, is the reference cylinder. Thus, the CPU 72 determines that misfires are occurring when the fluctuation amount difference value is less than the second determination threshold $\Delta th2$. At this time, the second determination threshold $\Delta th2$ is greater than the first determination threshold $\Delta th1$. Thus, when the reference cylinder is a fuel cut-off cylinder, the fluctuation amount difference value is not erroneously determined to be greater than or equal to the determination threshold even if misfires occur in the determination cylinder so that the fluctuation amount difference value increases.

The third embodiment described above further has the following operations and advantages.

(3-1) As the rotation speed NE of the crankshaft decreases, the detection time of the rotation angle required to calculate the instantaneous speed variable is extended. This increases the width of error of the rotation fluctuation amount $\Delta\omega30$, which is calculated from the angular velocity. The angular velocity is the reciprocal of the time required by the crank angle to rotate the specified angle. According to the present embodiment, the CPU 72 sets the first determination threshold $\Delta th1$ and the second determination threshold $\Delta th2$ to smaller values when the rotation speed NE is relatively low than when the rotation speed NE is relatively high. With the above-described configuration, the first determination threshold $\Delta th1$ and the second determination threshold $\Delta th2$ are decreased as the rotation speed NE decreases. Accordingly, the fluctuation amount difference value is unlikely to be erroneously determined to be less than the determination threshold. That is, the occurrence of misfire is unlikely to be erroneously determined even if the rotation speed is relatively low and the width of error of the rotation fluctuation amount is relatively large.

(3-2) The CPU 72 sets the first determination threshold $\Delta th1$ to a greater value and the second determination threshold $\Delta th2$ to a smaller value when the charging efficiency $\eta$ is relatively low than when the charging efficiency $\eta$ is relatively high. The angular velocity is the reciprocal of the time required by the rotation angle of the crankshaft 26 to rotate 30° CA. Thus, as the charging efficiency $\eta$ decreases, the rotation fluctuation amount $\Delta\omega30$ in a state in which misfires are not occurring decreases, since the rotation fluctuation is relatively small. When misfires occur in the determination cylinder, and the reference cylinder is a combustion cylinder, the fluctuation amount difference value increases as the charging efficiency $\eta$ decreases. In this regard, the above-described configuration sets the first determination threshold $\Delta th1$ to a greater value as the charging efficiency $\eta$ decreases. Accordingly, the rotation fluctuation amount is unlikely to be erroneously determined to be greater than or equal to the first determination threshold $\Delta th1$ even in a case in which the rotation fluctuation amount is relatively large. Also, when misfires are not occurring in the determination cylinder, and the reference cylinder is a fuel cut-off cylinder, the fluctuation amount difference value decreases as the charging efficiency decreases. In this regard, the above-described configuration sets the second determination threshold $\Delta th2$ to a smaller value as the charging efficiency $\eta$ decreases. Accordingly, the rotation fluctuation amount is unlikely to be erroneously determined to be less than the second determination threshold $\Delta th2$ even in a case in which the rotation fluctuation amount is relatively small. That is, the occurrence of misfires is unlikely to be erroneously determined even if the charging efficiency is relatively low and the fluctuation amount difference value is relatively small.

Fourth Embodiment

A fourth embodiment will now be described with reference to the drawings. The differences from the second embodiment will mainly be discussed.

In the fourth embodiment, whether misfires are occurring in the cylinders #1 to #4 is determined by using an angular velocity, which is the reciprocal of the time until 30° CA is reached, to calculate the rotation fluctuation amount or the fluctuation amount difference value.

Figure 10:
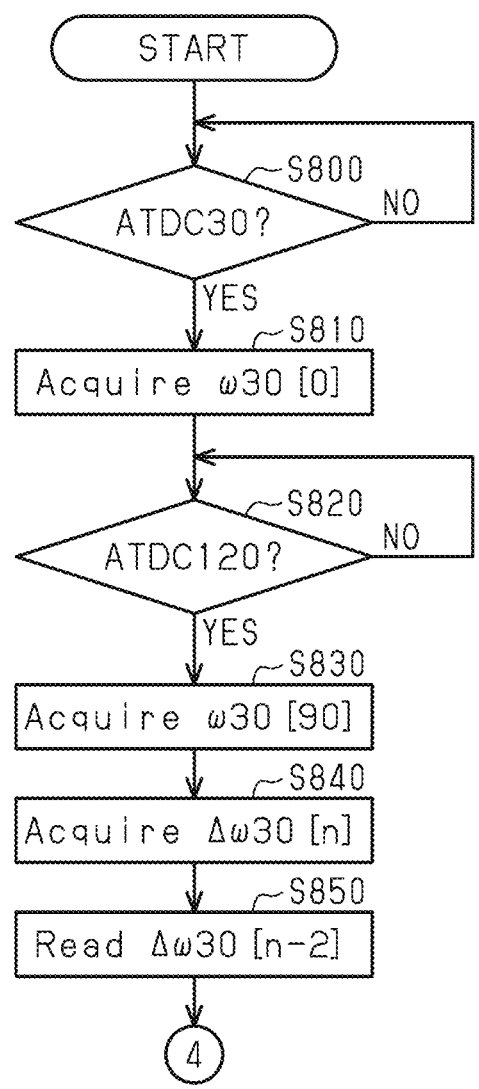
FIG. 10 is a flowchart showing a procedure of a process related to detection of misfires according to a fourth embodiment.

FIGS. 10 and 11 show the procedure of processes executed by the controller 70. The controller 70 according to the fourth embodiment executes the series of processes shown in FIGS. 10 and 11 in place of the series of processes described with reference to FIGS. 6 and 7. The process shown in FIGS. 10 and 11 is implemented by the CPU 72 repeatedly executing programs stored in the ROM 74 at a predetermined interval. FIGS. 10 and 11 show a procedure in which the cylinder #1, the cylinder #3, the cylinder #4, and the cylinder #2 reach the combustion stroke in the order, and the cylinder #1 is a fuel cut-off cylinder. When the cylinder #2, the cylinder #3, and the cylinder #4 are each a fuel cut-off cylinder, the cylinder numbers are replaced as necessary.

In the series of processes shown in FIGS. 10 and 11, the CPU 72 first determines whether the current rotation angle of the crankshaft 26 is 30° CA after top dead center (ATDC) with respect to the compression top dead center of any of the cylinders #1 to #4 (S800). When the current rotation angle of the crankshaft 26 is not 30° CA ATDC (S800: NO), the CPU 72 stands by until the current rotation angle is 30° CA ATDC. When the current rotation angle of the crankshaft 26 is 30° CA ATDC (S800: YES), the CPU 72 acquires an angular velocity ω30[0], which is the reciprocal of the time required by the crankshaft 26 to rotate 30CA° from the first compression top dead center (S810). Next, the CPU 72 determines whether the current rotation angle of the crankshaft 26 is 120° CA ATDC (S820). When the current rotation angle of the crankshaft 26 is not 120° CA ATDC (S820: NO), the CPU 72 stands by until the current rotation angle is 120° CA ATDC. When the current rotation angle of the crankshaft 26 is 120° CA ATDC (S820: YES), the CPU 72 acquires an angular velocity ω30[90], which is the reciprocal of the time required by the crankshaft 26 to rotate from 90° CA ATDC to 120° CA ATDC (S830). The number in brackets following ω30 indicates the rotation angle of the crankshaft 26 at which the angular velocity ω30 starts being measured.

Then, the CPU 72 subtracts the angular velocity ω30[0] from the angular velocity ω[90] and substitutes the resultant for a rotation fluctuation amount Δω30[n] related to the cylinder of which the compression top dead center has been detected by the process of S800 (S840). The rotation fluctuation amount Δω30 is a variable that has a negative value when misfires are not occurring in the cylinder subject to determination of misfires, and has a value close to 0 when misfires are occurring. The CPU 72 stores the rotation fluctuation amount Δω30[n] in the memory device 75. Then, the CPU 72 reads from the memory device 75 a rotation fluctuation amount Δω30[n−2] of the cylinder that reached the expansion stroke 360° CA earlier than the cylinder that has reached the expansion stroke and of which the compression top dead center has been detected by the process of S800 (S850). The rotation fluctuation amount Δω30[n−2] is a value that was stored in the memory device 75 by the process of S840 that was executed 360° CA earlier. For the illustrative purposes, the number in brackets following ΔT30 is a variable defined in the following manner in the present description. That is, the cylinder of which the compression top dead center is detected by the process of S800 is defined as an nth cylinder, and the number in brackets is decremented by 1 for each regression of the rotation angle as measured in 180° CA increments moving into the past from the present time. In the following description, the cylinder subject to determination of misfires will be referred to as a determination cylinder. Also, the cylinder that reaches the compression top dead center 360° CA earlier than the compression top dead center of the determination cylinder will be referred to as a reference cylinder.

The CPU 72 then determines whether the single-cylinder fuel cut-off control is currently being executed as shown in FIG. 11 (S860). When the single-cylinder fuel cut-off control is being executed (S860: YES), the CPU 72 determines whether the cylinders #2 and #3 are in the ATDC period (S870). When the cylinders #2 and #3 are not in the ATDC period (S870: NO), the CPU 72 determines whether the cylinder #4 is in the ATDC period (S875). When the cylinder #4 is in the ATDC period (S875: YES), the CPU 72 corrects the rotation fluctuation amount Δω30[n−2] to the rotation fluctuation amount Δω30'[n−2] (S880). The rotation fluctuation amount Δω30[n−2] corresponds to the rotation fluctuation amount Δω30[n−1] or the rotation fluctuation amount Δω30[n−3] that are obtained during the ATDC period of the cylinder #2 and the cylinder #3, which are combustion cylinders. The rotation fluctuation amount Δω30[n−2] is read from the memory device 75 in S850 and obtained during the ATDC period of the cylinder #1, which is a fuel cut-off cylinder. When executing the process of S880, the CPU 72 determines whether the fluctuation amount difference value, which is a value obtained by subtracting the rotation fluctuation amount Δω30[n−2] from the rotation fluctuation amount Δω30[n], is less than the first determination threshold Δth1 (S890). When the single-cylinder fuel cut-off control is not being executed (S860: NO) or when the cylinders #2 and #3 are determined to be in the ATDC period (S870: YES), the CPU 72 determines whether a fluctuation amount difference value, which is obtained by subtracting the rotation fluctuation amount Δω30[n−2] from the rotation fluctuation amount Δω30[n], is less than the first determination threshold Δth1 (S890). The rotation fluctuation amount Δω30[n] and the rotation fluctuation amount Δω30[n−2] have similar values when misfires are not occurring in the cylinder subject to determination of misfire. Accordingly, the result of the subtraction is a value close to 0. In contrast, in a case in which misfires are occurring in the cylinder subject to determination of misfire, the subtraction result is a negative value and its absolute value is relatively large. The first determination threshold Δth1 is set to a negative value having such a magnitude that misfires are determined to be occurring in a determination cylinder when the fluctuation amount difference value is less the first determination threshold Δth1, and that no misfires are determined to be occurring in the determination cylinder when the fluctuation amount difference value is greater than or equal to the first determination threshold Δth1.

The CPU 72 variably sets the first determination threshold Δth1 using the charging efficiency η, which is an index value of torque, as an input. Specifically, the CPU 72 sets the first determination threshold Δth1 to a greater value when the charging efficiency η is relatively low than when the charging efficiency η is relatively high. The ROM 74 stores in advance map data having the charging efficiency η as an input variable and the first determination threshold Δth1 as an output variable. The CPU 72 implements this process by obtaining the first determination threshold Δth1 through map calculation.

The CPU 72 also variably sets the rotation fluctuation amount Δω30[n−2] using the charging efficiency η as an input. Specifically, the CPU 72 corrects the rotation fluctuation amount $\Delta\omega 30[n-2]$ to a greater value when the charging efficiency $\eta$ is relatively low than when the charging efficiency $\eta$ is relatively high. The ROM 74 stores in advance map data having the charging efficiency $\eta$ as an input variable and the rotation fluctuation amount $\Delta\omega 30[n-2]$ as an output variable. The CPU 72 implements this process by obtaining the rotation fluctuation amount $\Delta\omega 30[n-2]$ through map calculation.

The map data refers to a data set of discrete values of input variables and values of output variables each corresponding to a value of the input variables. When the value of an input variable agrees with any of the values of the input variable on the map data, the map calculation uses the value of the corresponding output variable on the map data as the calculation result. When the value of the input variable does not agree with any of the values of the input variable on the map data, the map calculation uses, as the calculation result, a value obtained through interpolation of multiple values of the output variable included in the map data set.

When the fluctuation amount difference value is less than the first determination threshold $\Delta th1$ (S890: YES), the CPU 72 determines that misfires are occurring in the determination cylinder and increments the counter Cn (S900). The counter Cn includes counters C1 to C4 respectively corresponding to the cylinders #1 to #4. The counters C1 to C4 are collectively referred to as the counter Cn. The CPU 72 executes the process of S910 when the process of S900 is completed, when the cylinder #4 is not in the ATDC period (S875: NO), or when the fluctuation amount difference value is greater than or equal to the first determination threshold $\Delta th1$ (S890: NO). In S910, the CPU 72 determines whether a predetermined time has elapsed since the start of a consecutive misfire determination process for the determination cylinder. When the process of S890 is executed for the first time since the start of the engine operation, the consecutive misfire determination process is executed for the first time since the start of the engine operation. Also, after the first consecutive misfire determination process since the start of the engine operation is finished, the process of S925, which will be discussed below, is executed. Thereafter, the consecutive misfire determination process is started again when the process of S890 is executed for the first time. When the cylinder #4 is not in the ATDC period (S875: NO), the cylinder #1, which is a fuel cut-off cylinder, is in the ATDC period. In this case, the CPU 72 does not execute the processes of S880 to S900, and does not execute the determination of misfires in the cylinder #1.

When the predetermined time has not elapsed (S910: NO), CPU 72 temporarily suspends the series of processes shown in FIGS. 10 and 11. On the other hand, when the predetermined time has elapsed (S910: YES), the CPU 72 determines whether the counter Cn is greater than or equal to a threshold Cnth (S920). The threshold Cnth is set in accordance with the number of times misfires occur within a predetermined amount of time when misfires are occurring consecutively in the determination cylinder. When the counter Cn is greater than or equal to the threshold Cnth (S920: YES), the CPU 72 determines that misfires are occurring consecutively in the determination cylinder (S930). That is, the CPU 72 determines the occurrence of consecutive misfires in the determination cylinder. Then, the CPU 72 operates a warning lamp 100 shown in FIG. 1 to execute a notification process to inform the user of the occurrence of consecutive misfires (S940). In contrast, when the counter Cn is less than the threshold Cnth (S920: NO), CPU 72 initializes the counter Cn (S925) and ends the consecutive misfire determination. The CPU 72 thus temporarily suspends the series of processes shown in FIGS. 10 and 11.

An operation and advantages of the fourth embodiment will now be described.

In a case in which the cylinder #4 is the determination cylinder, the cylinder #1, which a fuel cut-off cylinder, is the reference cylinder. Thus, the CPU 72 corrects the rotation fluctuation amount $\Delta\omega 30[n-2]$ to the rotation fluctuation amount $\Delta\omega 30[n-2]$, which corresponds to the rotation fluctuation amount $\Delta\omega 30[n-1]$ or the rotation fluctuation amount $\Delta\omega 30[n-3]$, which are obtained during the ATDC period of the cylinder #2 and the cylinder #3, which are the combustion cylinders. At this time, the CPU 72 determines that misfires are occurring when the fluctuation amount difference value, which is a value obtained by subtracting the rotation fluctuation amount $\Delta\omega 30[n-2]$ from the rotation fluctuation amount $\Delta\omega 30[n]$, is less than the first determination threshold $\Delta th1$.

The rotation fluctuation amount $\Delta\omega 30$ that has been obtained in the ATDC period of the fuel cut-off cylinder has a value substantially equal to 0. On the other hand, the rotation fluctuation amount $\Delta\omega 30$ that has been obtained in the ATDC period of the combustion cylinder has a positive value. Since the controller 70 according to the fourth embodiment corrects the rotation fluctuation amount $\Delta\omega 30[n-2]$, the corrected rotation fluctuation amount $\Delta\omega 30$ has a positive value even in a case in which the reference cylinder is a fuel cut-off cylinder. Thus, even if misfires are occurring in the determination cylinder, the fluctuation amount difference value does not become a value substantially equal to 0, but becomes a negative value. Accordingly, the fluctuation amount difference value is unlikely to be erroneously determined to be greater than or equal to the first determination threshold $\Delta th1$.

The fourth embodiment described above further has the following operations and advantages.

(4-1) The CPU 72 sets the first determination threshold $\Delta th1$ to a greater value when the charging efficiency $\eta$ is relatively low than when the charging efficiency $\eta$ is relatively high. The angular velocity is the reciprocal of the time required by the rotation angle of the crankshaft 26 to rotate 30° CA. Thus, as the charging efficiency $\eta$ decreases, the rotation fluctuation amount $\Delta\omega 30$ in a state in which misfires are not occurring decreases, since the rotation fluctuation is relatively small. When misfires occur in the determination cylinder, and the reference cylinder is a combustion cylinder, the fluctuation amount difference value increases as the charging efficiency $\eta$ decreases. In this regard, the above-described configuration sets the first determination threshold $\Delta th1$ to a greater value as the charging efficiency $\eta$ decreases. Accordingly, the rotation fluctuation amount is unlikely to be erroneously determined to be greater than or equal to the first determination threshold $\Delta th1$ even in a case in which the rotation fluctuation amount is relatively small.

(4-2) The CPU 72 sets the rotation fluctuation amount $\Delta\omega 30'[n-2]$ to a smaller value when the charging efficiency $\eta$ is relatively low than when the charging efficiency $\eta$ is relatively high. As the charging efficiency $\eta$ decreases, the rotation fluctuation amount $\Delta\omega 30$ in the combustion cylinder decreases. In this regard, the above-described configuration sets the rotation fluctuation amount $\Delta\omega 30[n-2]$ to a smaller value when the charging efficiency $\eta$ is relatively low than when the charging efficiency $\eta$ is relatively high. Thus, the fluctuation amount difference value is unlikely to be erroneously determined to be greater than or equal to the first determination threshold. The fluctuation amount difference value is obtained by subtracting, from the rotation fluctuation amount Δω30[n], the rotation fluctuation amount Δω30[n−2], which has been corrected to the rotation fluctuation amount Δω30[n−2].

<Correspondence>

The correspondence between the items in the above-described embodiments and the items described in the above SUMMARY is as follows. The single-cylinder fuel cut-off process corresponds to the processes of S140 and S150 of FIG. 2. The instantaneous speed calculating process corresponds to the processes of S200 to S230 of FIG. 3, the processes of S400 to S430 of FIG. 6, the processes of S600 to S630 of FIG. 8, and the processes of S800 to S830 of FIG. 10. The instantaneous speed variable corresponds to the time T30 and the angular velocity ω30. The rotation fluctuation amount calculating process corresponds to the process of S240 of FIG. 3, the process of S440 of FIG. 6, the process of S640 of FIG. 8, and the process of S840 of FIG. 10. The first rotation fluctuation amount corresponds to the rotation fluctuation amount ΔT30[n] and rotation fluctuation amount Δω30[n]. The second rotation fluctuation amount corresponds to the rotation fluctuation amount ΔT30[n−2] and rotation fluctuation amount Δω30[n−2]. The fluctuation amount difference value calculating process and the misfire determining process correspond to the process of S280 and S285 of FIG. 4, the process of S490 of FIG. 7, the processes of S680 and S685 of FIG. 9, and the process of S890 of FIG. 11. The correcting process corresponds to the process of S285 of FIG. 4, the process of S480 of FIG. 7, the process of S685 of FIG. 9, and the process of S880 of FIG. 11. The value corresponding to the second rotation fluctuation amount corresponds to the rotation fluctuation amount ΔT30'[n−2] and the rotation fluctuation amount Δω30[n−2].

Other Embodiments

The followings are modifications commonly applicable to the above embodiments. The following modifications can be combined as long as the combined modifications remain technically consistent with each other.

Modifications Related to Instantaneous Speed Variable

In the above-described embodiments, the instantaneous speed variable is used, which is a variable indicating the rotation speed of the crankshaft 26 in the crank angle range shorter than the interval of the compression top dead center. The crank angle range that defines the instantaneous speed variable is 30° CA in the above-described embodiments, but the present disclosure is not limited to this. For example, the crank angle range may be 10° CA or may be the interval of the compression top dead center.

Modification Related to Rotation Fluctuation Amount

In the above-described embodiments, the rotation fluctuation amount ΔT30 is defined as the difference between instantaneous speed variables separated by 90° CA. For example, the rotation fluctuation amount ΔT30 may be defined as the difference between instantaneous speed variables separated by 60° CA.

Modification Related to Index Value of Torque

In the above-described embodiments, the charging efficiency η is calculated, and the calculated charging efficiency η is used as an index value of the torque of the internal combustion engine 10. The index value of the torque is not limited to the charging efficiency η. For example, an estimated value of the torque may be calculated, and the resultant estimated value may be used as the index value of the torque. Also, in place of the charging efficiency an accelerator operated amount may be used as the index value of the torque of the internal combustion engine 10.

Modification Related to Predetermined Angular Interval

In the process of S250 of FIG. 3, the process of S450 of FIG. 6, the process of S650 of FIG. 8, or the process of S850 of FIG. 10, the rotation fluctuation amount of the cylinder that reaches the expansion stroke 360° CA earlier than the determination cylinder is read from the rotation fluctuation amount of the determination cylinder in order to detect the occurrence of consecutive misfire. However, the present disclosure is not limited to this. For example, in order to detect random misfires of the cylinders #1 to #4 of the internal combustion engine 10, the rotation fluctuation amount of the cylinder that reaches the expansion stroke 720° CA earlier than the determination cylinder may be read. In this case, the fluctuation amount difference value may be obtained by subtracting the rotation fluctuation amount ΔT30[n−4] or rotation fluctuation amount Δω30[n−4] from the rotation fluctuation amount ΔT30[n] or rotation fluctuation amount Δω30[n] in the processes of S280, 285 of FIG. 4 the process of S490 of FIG. 7, the processes of S680 and S685 of FIG. 9, or the process of S890 of FIG. 11.

Modification Related to Determination Threshold

In the above-described embodiments, the first determination threshold Δth1 and the second determination threshold Δth2 are varied based on the rotation speed NE and the charging efficiency η. However, the present disclosure is not limited to this. Instead of varying the determination thresholds based on both the rotation speed NE and the variable indicating the load, it is possible to vary the variables based on only one of the two. Further, it is possible to vary the determination threshold based on the coolant temperature THW and at least one of the rotation speed NE and the variable indicating the torque.

Modification Related to Single-Cylinder Fuel Cut-Off Process

The air-fuel ratio of the air-fuel mixture in the combustion cylinder does not necessarily need to be the stoichiometric air-fuel ratio. For example, the air-fuel ratio of the air-fuel mixture in the combustion cylinder may be slightly rich as long as the total air-fuel ratio of the fuel cut-off cylinder and the combustion cylinder is lean.

The starting condition of the single-cylinder fuel cut-off process is not limited to the following expression being satisfied: Air-fuel ratio ΔFr≤Single-cylinder fuel cut-off execution value AF1. For example, the single-cylinder fuel cut-off process may be executed when the accumulated amount of deposit in the GPF 34 is estimated to be greater than or equal to a predetermined value. In this case, the air-fuel ratio in the combustion cylinder may be made rich. Also, the estimation of the accumulated amount may be performed based on the intake air amount Ga and the pressure difference between the upstream side and the downstream side of the GPF 34. Alternatively, the estimation may be performed based on the rotation speed NE, the charging efficiency η, and the coolant temperature THW.

Modification Related to Reflection of Determination Result of Misfire

In the above-described embodiments, the notification process is executed using the warning lamp 100 when it is determined that consecutive misfires are occurring. However, the present disclosure is not limited to this. The notification process is not limited to a process that operates a device outputting visual information, but may be a process that operates a device outputting audio information.

The determination result of consecutive misfires does not necessarily need to be used in the notification process. For example, when consecutive misfires occur, a process may be executed that controls the internal combustion engine 10 to operate in an operating state that is less likely to cause consecutive misfire.

Modification Related to Controller

The controller is not limited to a device that includes the CPU 72 and the ROM 74 and executes software processing. For example, at least part of the processes executed by the software in the above-described embodiments may be executed by hardware circuits dedicated to executing these processes (such as an application-specific integrated circuit (ASIC)). That is, the controller may be modified as long as it has any one of the following configurations (a) to (c). (a) A configuration including a processor that executes all of the above-described processes according to programs and a program storage device such as a ROM that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. Multiple software processing devices each including a processor and a program storage device and multiple dedicated hardware circuits may be provided.

Modification Related to Vehicle

The vehicle is not limited to a series-parallel hybrid vehicle, but may be a parallel hybrid vehicle or a series hybrid vehicle. Further, the vehicle is not limited to a hybrid electric vehicle, but may be a vehicle that includes only the internal combustion engine 10 as a driver force generator.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A misfire determination apparatus for an internal combustion engine, the internal combustion engine being a multi-cylinder internal combustion engine having a catalyst that is provided in an exhaust system and purifies exhaust gas, the misfire determination apparatus being configured to execute:
   a single-cylinder fuel cut-off process that executes a single-cylinder fuel cut-off control that stops fuel supply to a fuel cut-off cylinder and performs fuel supply to other remaining combustion cylinders;
   an instantaneous speed calculating process that calculates an instantaneous speed variable, the instantaneous speed variable being an index value of a rotation speed of a crankshaft;
   a rotation fluctuation amount calculating process that calculates a rotation fluctuation amount, the rotation fluctuation amount being an amount of change of the instantaneous speed variable;
   a fluctuation amount difference value calculating process that calculates a fluctuation amount difference value obtained by subtracting, from a first rotation fluctuation amount, a second rotation fluctuation amount, the first rotation fluctuation amount being the rotation fluctuation amount of a determination cylinder, which is subject to misfire detection, and the second rotation fluctuation amount being the rotation fluctuation amount of a reference cylinder, the reference cylinder reaching an expansion stroke at a point in time that is earlier than an expansion stroke of the determination cylinder by 360° crank angle multiplied by an integer;
   a misfire determining process that determines that a misfire has occurred in the determination cylinder when a misfire condition is satisfied based on a magnitude relationship between the fluctuation amount difference value and a determination threshold; and
   a correcting process that performs, if the reference cylinder is the fuel cut-off cylinder when the misfire determining process is executed, a correction for reducing an influence of a fact that the reference cylinder is the fuel cut-off cylinder on a result of a misfire determination, wherein
   the instantaneous speed variable is time required by a crank angle to rotate a specified angle,
   the misfire determining process determines that a misfire has occurred in the determination cylinder when the fluctuation amount difference value is greater than or equal to the determination threshold,
   the determination threshold in a case in which the reference cylinder is the combustion cylinder is defined as a first determination threshold,
   the correcting process corrects the determination threshold in a case in which the reference cylinder is the fuel cut-off cylinder to a second determination threshold, which is less than the first determination threshold, and
   the determination threshold in the misfire determining process is increased as the rotation speed of the crankshaft decreases.

2. A misfire determination apparatus for an internal combustion engine, the internal combustion engine being a multi-cylinder internal combustion engine having a catalyst that is provided in an exhaust system and purifies exhaust gas, the misfire determination apparatus being configured to execute:
   a single-cylinder fuel cut-off process that executes a single-cylinder fuel cut-off control that stops fuel supply to a fuel cut-off cylinder and performs fuel supply to other remaining combustion cylinders;
   an instantaneous speed calculating process that calculates an instantaneous speed variable, the instantaneous speed variable being an index value of a rotation speed of a crankshaft;
   a rotation fluctuation amount calculating process that calculates a rotation fluctuation amount, the rotation fluctuation amount being an amount of change of the instantaneous speed variable;
   a fluctuation amount difference value calculating process that calculates a fluctuation amount difference value obtained by subtracting, from a first rotation fluctuation amount, a second rotation fluctuation amount, the first rotation fluctuation amount being the rotation fluctuation amount of a determination cylinder, which is subject to misfire detection, and the second rotation fluctuation amount being the rotation fluctuation amount of a reference cylinder, the reference cylinder reaching an expansion stroke at a point in time that is earlier than an expansion stroke of the determination cylinder by 360° crank angle multiplied by an integer;

a misfire determining process that determines that a misfire has occurred in the determination cylinder when a misfire condition is satisfied based on a magnitude relationship between the fluctuation amount difference value and a determination threshold; and a correcting process that performs, if the reference cylinder is the fuel cut-off cylinder when the misfire determining process is executed, a correction for reducing an influence of a fact that the reference cylinder is the fuel cut-off cylinder on a result of a misfire determination, wherein the correcting process corrects the second rotation fluctuation amount in a case in which the reference cylinder is the fuel cut-off cylinder to a value equivalent to the second rotation fluctuation amount in a case in which the reference cylinder is the combustion cylinder.

3. The misfire determination apparatus for the internal combustion engine according to claim 2, wherein the misfire determination apparatus is configured to further execute a torque calculating process that calculates an index value of torque of the internal combustion engine, the instantaneous speed variable is time required by a crank angle to rotate a specified angle, the misfire determining process determines that a misfire has occurred in the determination cylinder when the fluctuation amount difference value is greater than or equal to the determination threshold, and the correcting process corrects the second rotation fluctuation amount such that the second rotation fluctuation amount increases as the index value of the torque calculated by the torque calculating process decreases.

4. The misfire determination apparatus for the internal combustion engine according to claim 2, wherein the misfire determination apparatus is configured to further execute a torque calculating process that calculates an index value of torque of the internal combustion engine, wherein the instantaneous speed variable is an angular velocity when a crank angle rotates a specified angle, the misfire determining process determines that a misfire has occurred in the determination cylinder when the fluctuation amount difference value is less than the determination threshold, and the correcting process corrects the second rotation fluctuation amount such that the second rotation fluctuation amount decreases as the index value of the torque calculated by the torque calculating process decreases.

5. A misfire determination apparatus for an internal combustion engine, the internal combustion engine being a multi-cylinder internal combustion engine having a catalyst that is provided in an exhaust system and purifies exhaust gas, the misfire determination apparatus being configured to execute:

a single-cylinder fuel cut-off process that executes a single-cylinder fuel cut-off control that stops fuel supply to a fuel cut-off cylinder and performs fuel supply to other remaining combustion cylinders;

an instantaneous speed calculating process that calculates an instantaneous speed variable, the instantaneous speed variable being an index value of a rotation speed of a crankshaft;

a rotation fluctuation amount calculating process that calculates a rotation fluctuation amount, the rotation fluctuation amount being an amount of change of the instantaneous speed variable;

a fluctuation amount difference value calculating process that calculates a fluctuation amount difference value obtained by subtracting, from a first rotation fluctuation amount, a second rotation fluctuation amount, the first rotation fluctuation amount being the rotation fluctuation amount of a determination cylinder, which is subject to misfire detection, and the second rotation fluctuation amount being the rotation fluctuation amount of a reference cylinder, the reference cylinder reaching an expansion stroke at a point in time that is earlier than an expansion stroke of the determination cylinder by 360° crank angle multiplied by an integer;

a misfire determining process that determines that a misfire has occurred in the determination cylinder when a misfire condition is satisfied based on a magnitude relationship between the fluctuation amount difference value and a determination threshold; and a correcting process that performs, if the reference cylinder is the fuel cut-off cylinder when the misfire determining process is executed, a correction for reducing an influence of a fact that the reference cylinder is the fuel cut-off cylinder on a result of a misfire determination, wherein the misfire determining process does not perform the misfire determination when the determination cylinder is the fuel cut-off cylinder.

\* \* \* \* \*